United States Patent
Kim et al.

(10) Patent No.: US 10,135,963 B2
(45) Date of Patent: Nov. 20, 2018

(54) MOBILE TERMINAL AND CONTROL METHOD FOR THE MOBILE TERMINAL

(71) Applicant: LG ELECTRONICS INC., Seoul (KR)

(72) Inventors: Minchul Kim, Seoul (KR); Jeonghyun Lee, Seoul (KR); Kyungmin Cho, Seoul (KR); Jaemoo Lee, Seoul (KR); Jongkyeong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/021,411

(22) PCT Filed: Apr. 15, 2014

(86) PCT No.: PCT/KR2014/003246
§ 371 (c)(1),
(2) Date: Mar. 11, 2016

(87) PCT Pub. No.: WO2015/056854
PCT Pub. Date: Apr. 23, 2015

(65) Prior Publication Data
US 2016/0227016 A1    Aug. 4, 2016

(30) Foreign Application Priority Data
Oct. 16, 2013   (KR) .................... 10-2013-0123518

(51) Int. Cl.
| H04M 1/725 | (2006.01) |
| G02B 3/00 | (2006.01) |
| H04N 5/225 | (2006.01) |
| H04N 5/232 | (2006.01) |
| H04N 13/02 | (2006.01) |

(52) U.S. Cl.
CPC ...... *H04M 1/72522* (2013.01); *G02B 3/0043* (2013.01); *H04N 5/2251* (2013.01);
(Continued)

(58) Field of Classification Search
CPC ............. H04N 19/597; H04N 13/0242; H04N 13/0271; H04N 19/136; H04N 19/85;
(Continued)

(56) References Cited

U.S. PATENT DOCUMENTS

| 8,514,491 B2 | 8/2013 | Duparre |
| 2008/0030589 A1 | 2/2008 | Shin et al. |

(Continued)

FOREIGN PATENT DOCUMENTS

| KR | 2011-0045549 | 5/2011 |
| KR | 2012-0113854 | 10/2012 |
| WO | 2013-020601 | 2/2013 |

*Primary Examiner* — George Eng
*Assistant Examiner* — Jing Gao
(74) *Attorney, Agent, or Firm* — Lee, Hong, Degerman, Kang & Waimey

(57) ABSTRACT

A mobile terminal that may take images and a control method for the mobile terminal are disclosed. The mobile terminal comprises a display module; a camera provided with a plurality of lenses; and a controller configured to receive images through the plurality of lenses and outputting the received images on the display module, wherein the controller generates one moving image data by using an image received from the first lens of the plurality of lenses and an image received from the second lens different from the first lens.

22 Claims, 15 Drawing Sheets

(52) U.S. Cl.
CPC ..... *H04N 5/23232* (2013.01); *H04N 5/23293* (2013.01); *H04N 13/0232* (2013.01); *H04M 2250/52* (2013.01)

(58) Field of Classification Search
CPC .......... H04N 13/0018; H04N 13/0275; H04N 5/2258; H04N 5/247; H04N 5/23232; H04N 5/23238; H04N 13/0051; H04N 13/025; H04N 19/56; H04N 5/23258; H04N 5/265; H04N 5/23216; H04N 5/23293; H04N 5/2356; H04N 19/172; H04N 19/577; H04N 2007/145; H04N 21/4223; H04N 13/0447; G06F 3/041; G06F 3/005; H04M 1/72522
See application file for complete search history.

(56) References Cited

U.S. PATENT DOCUMENTS

| | | | | |
|---|---|---|---|---|
| 2011/0267530 | A1* | 11/2011 | Chun | G06F 3/04883 348/333.11 |
| 2012/0113216 | A1* | 5/2012 | Seen | H04N 5/23293 348/38 |
| 2012/0188332 | A1* | 7/2012 | Yamaguchi | H04N 1/215 348/36 |
| 2013/0077880 | A1* | 3/2013 | Venkataraman | G06T 9/00 382/232 |
| 2013/0141428 | A1* | 6/2013 | Gipson | G06T 19/003 345/419 |
| 2013/0147810 | A1* | 6/2013 | Guldogan | H04N 5/23296 345/473 |

\* cited by examiner

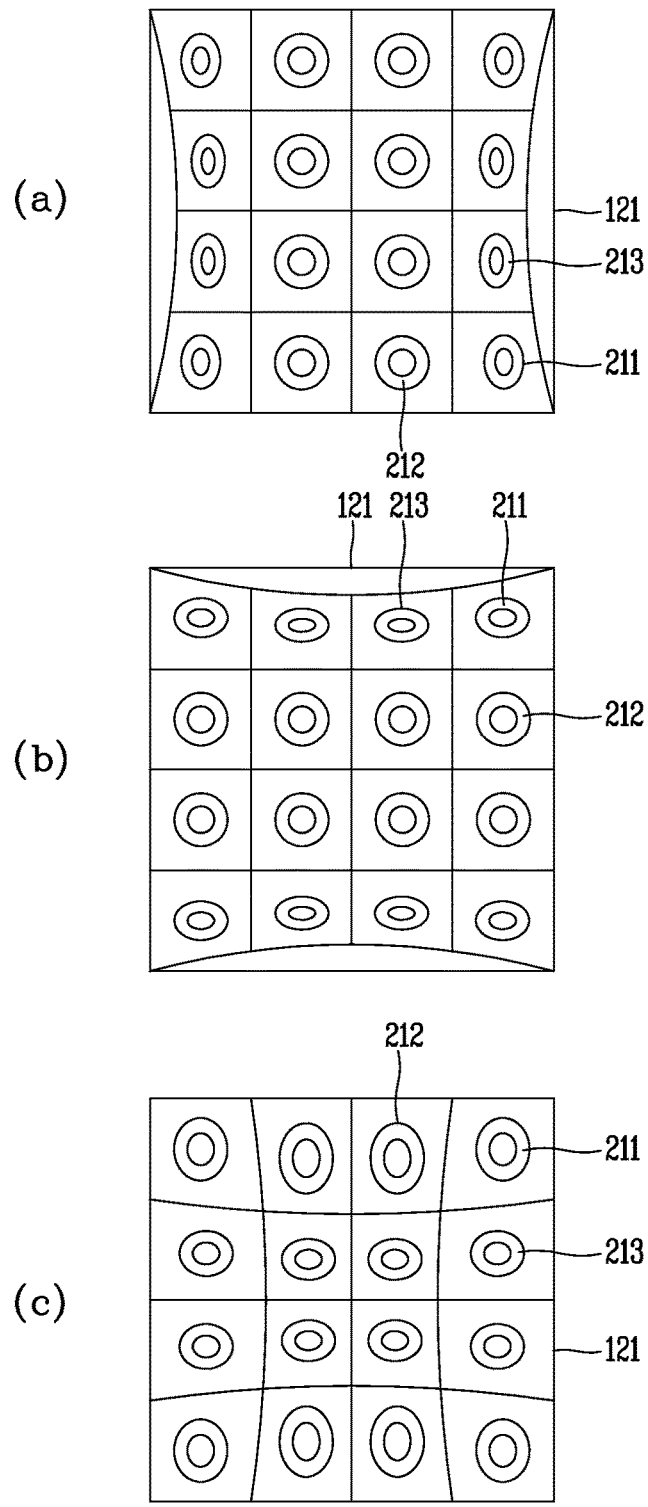

FIG. 2E
(a) 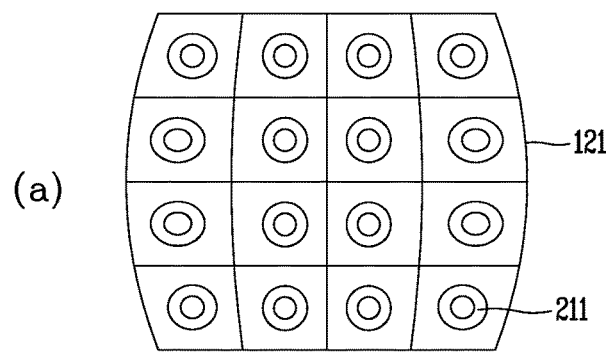
(b) 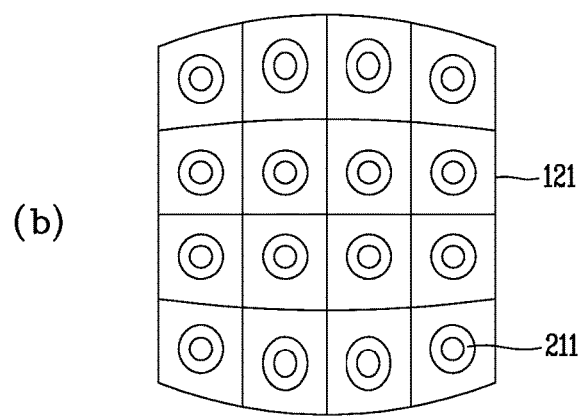
(c) 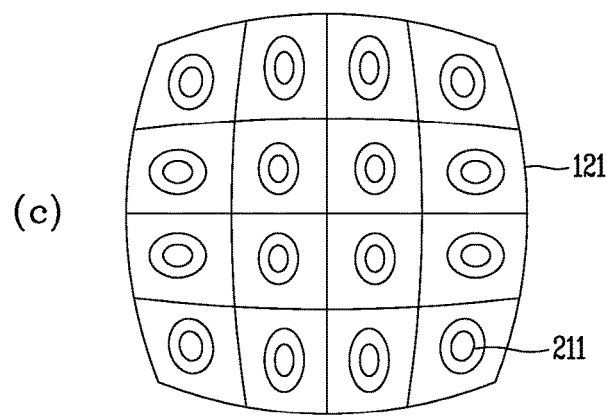

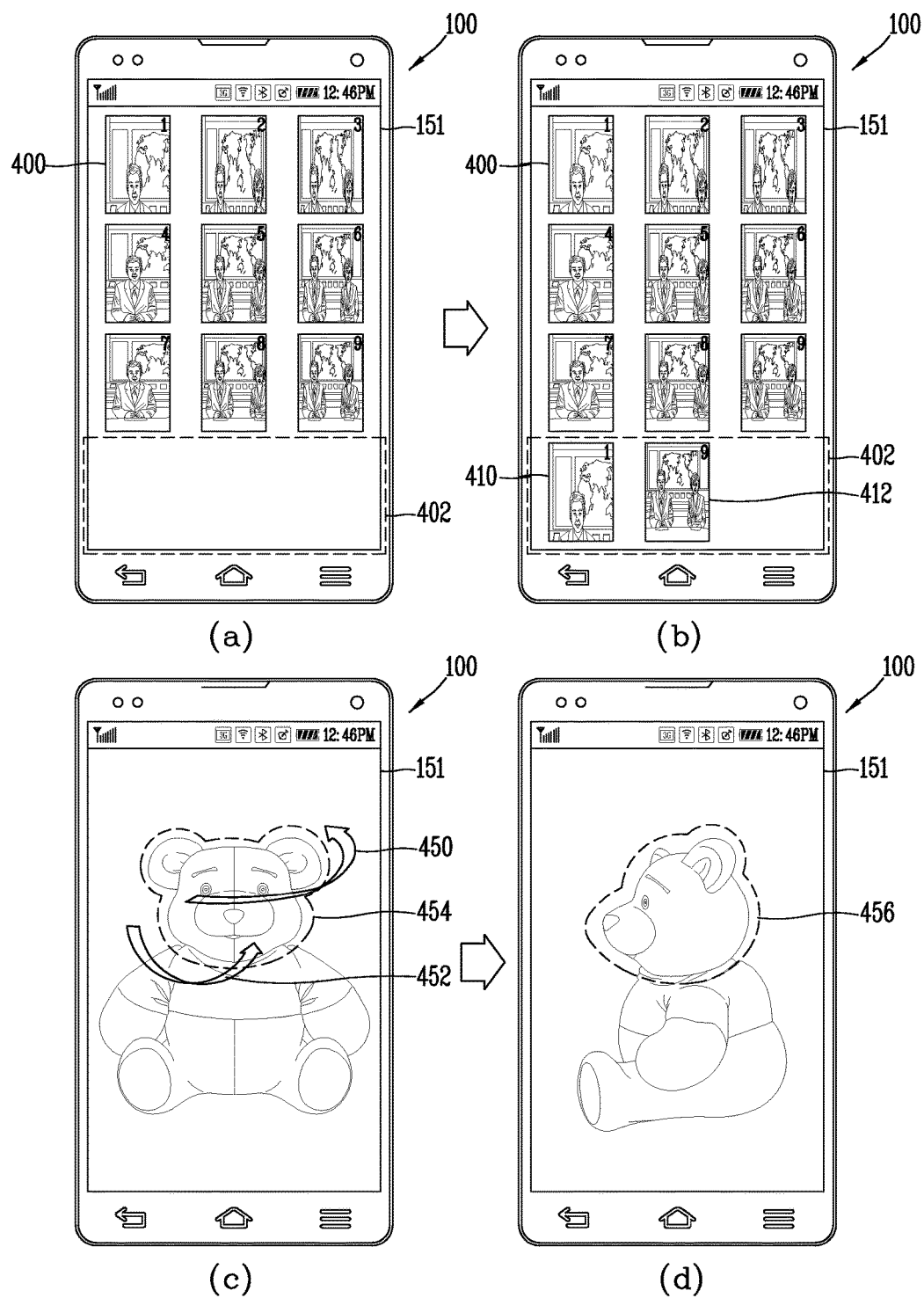

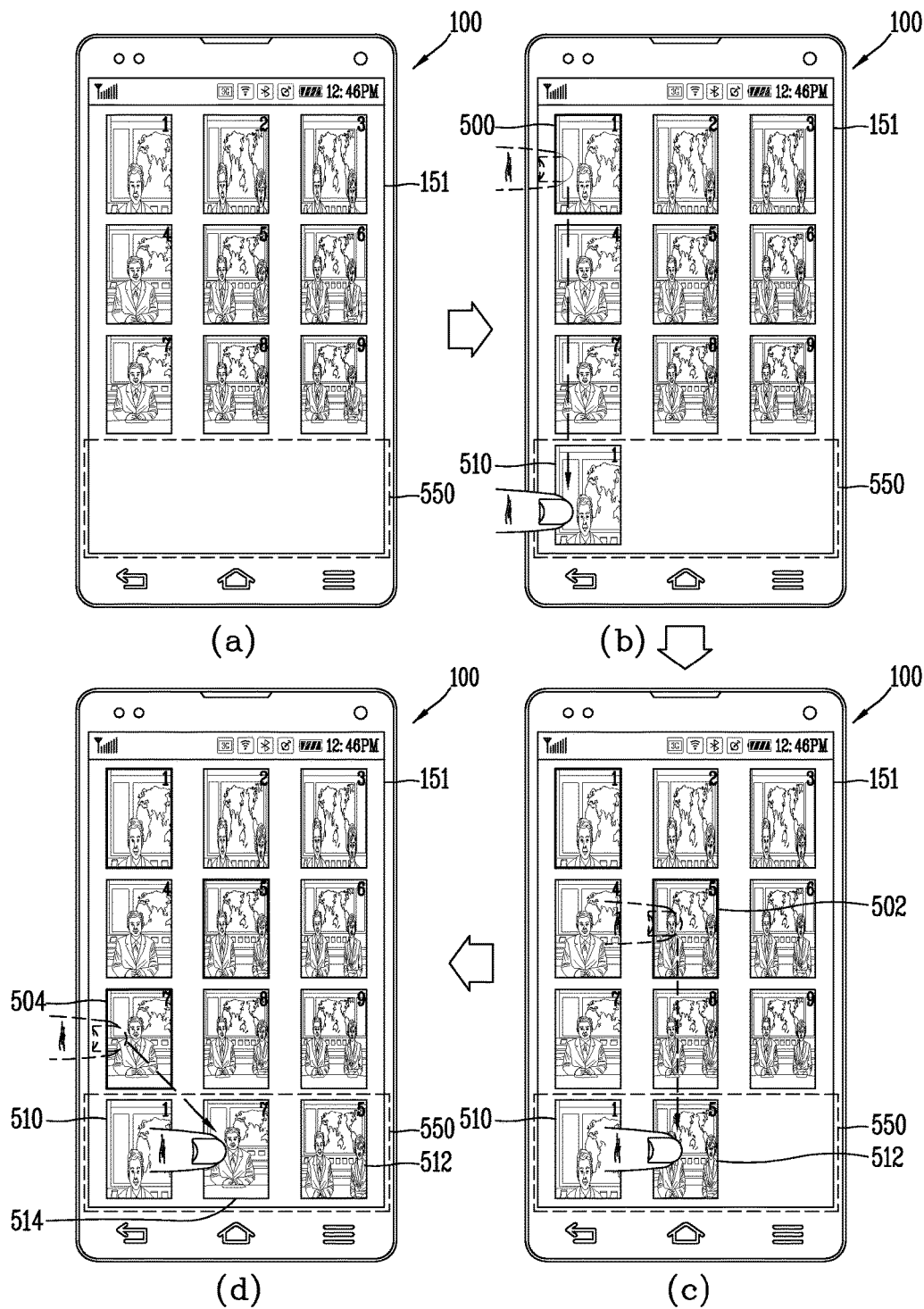

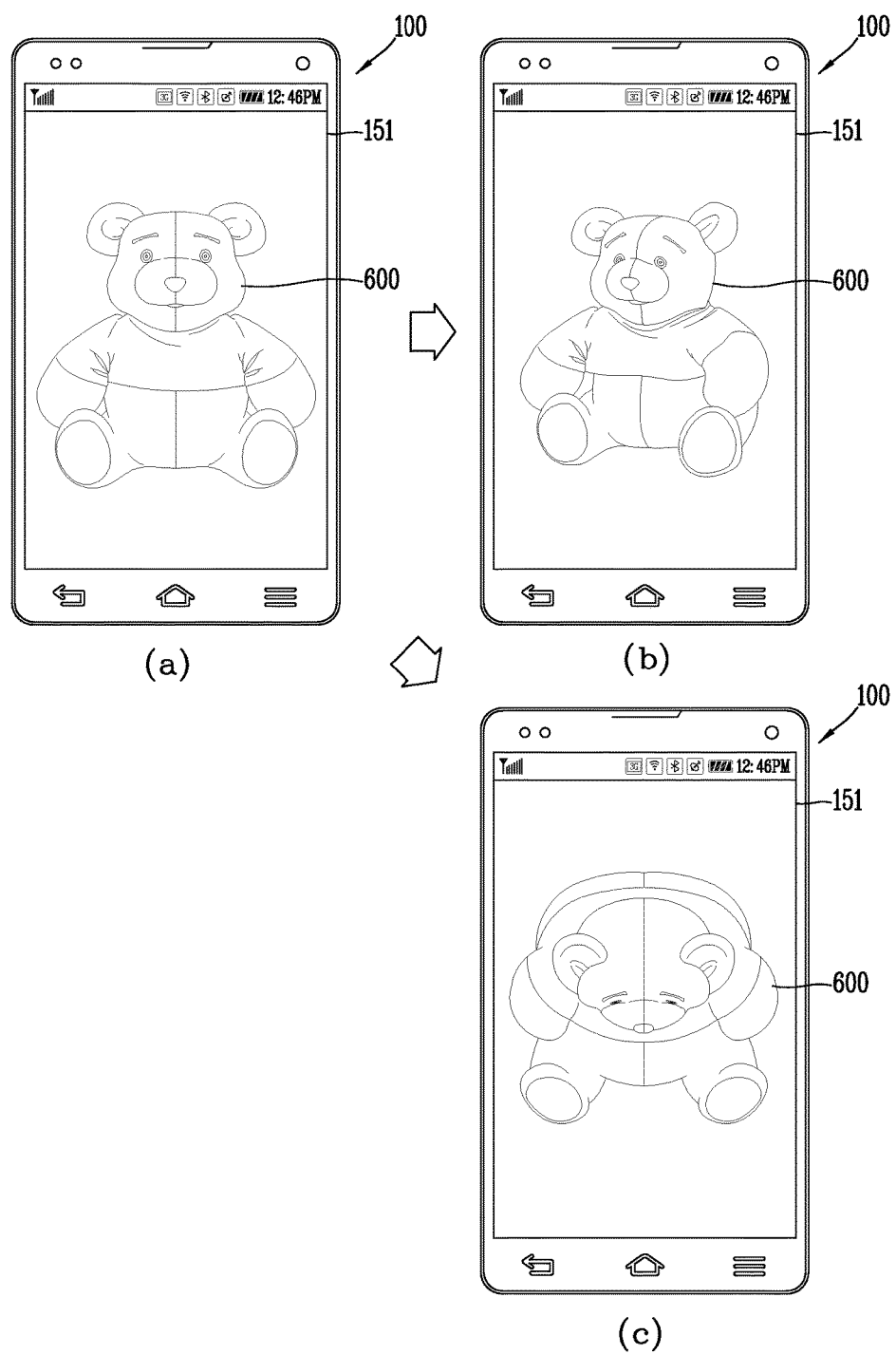

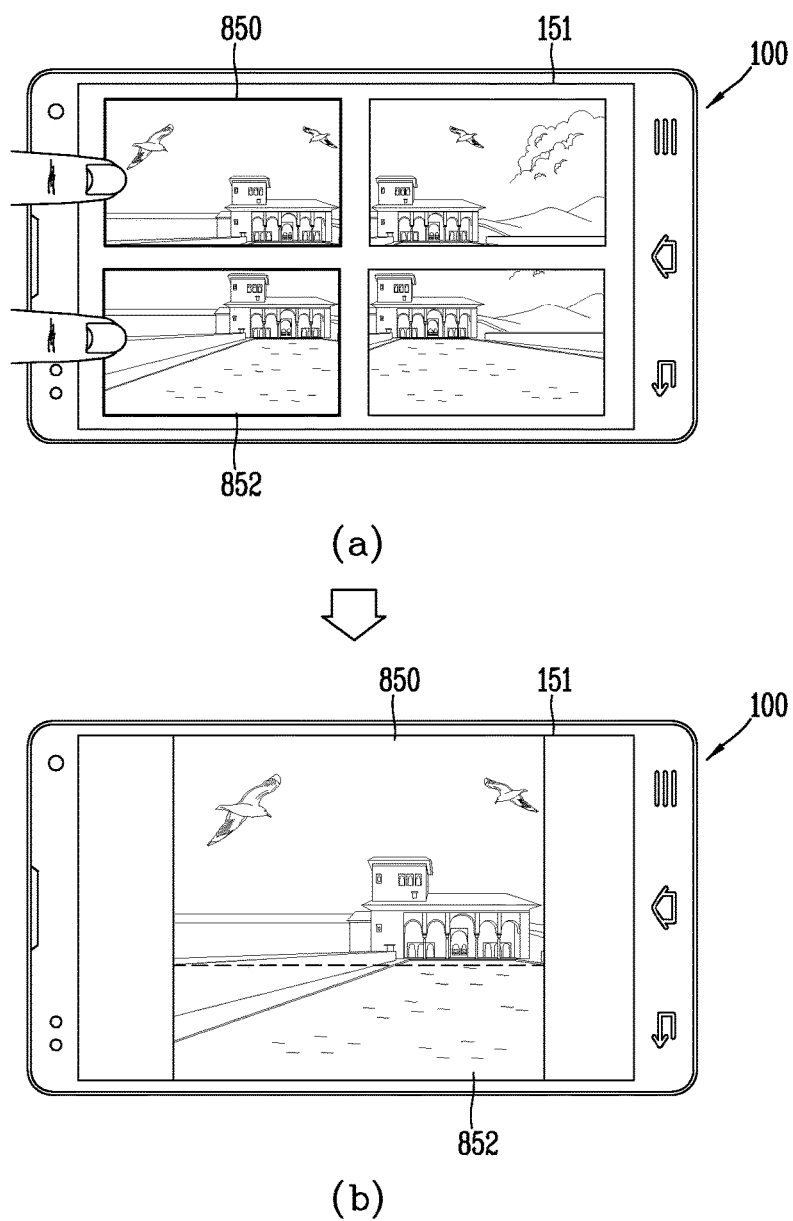

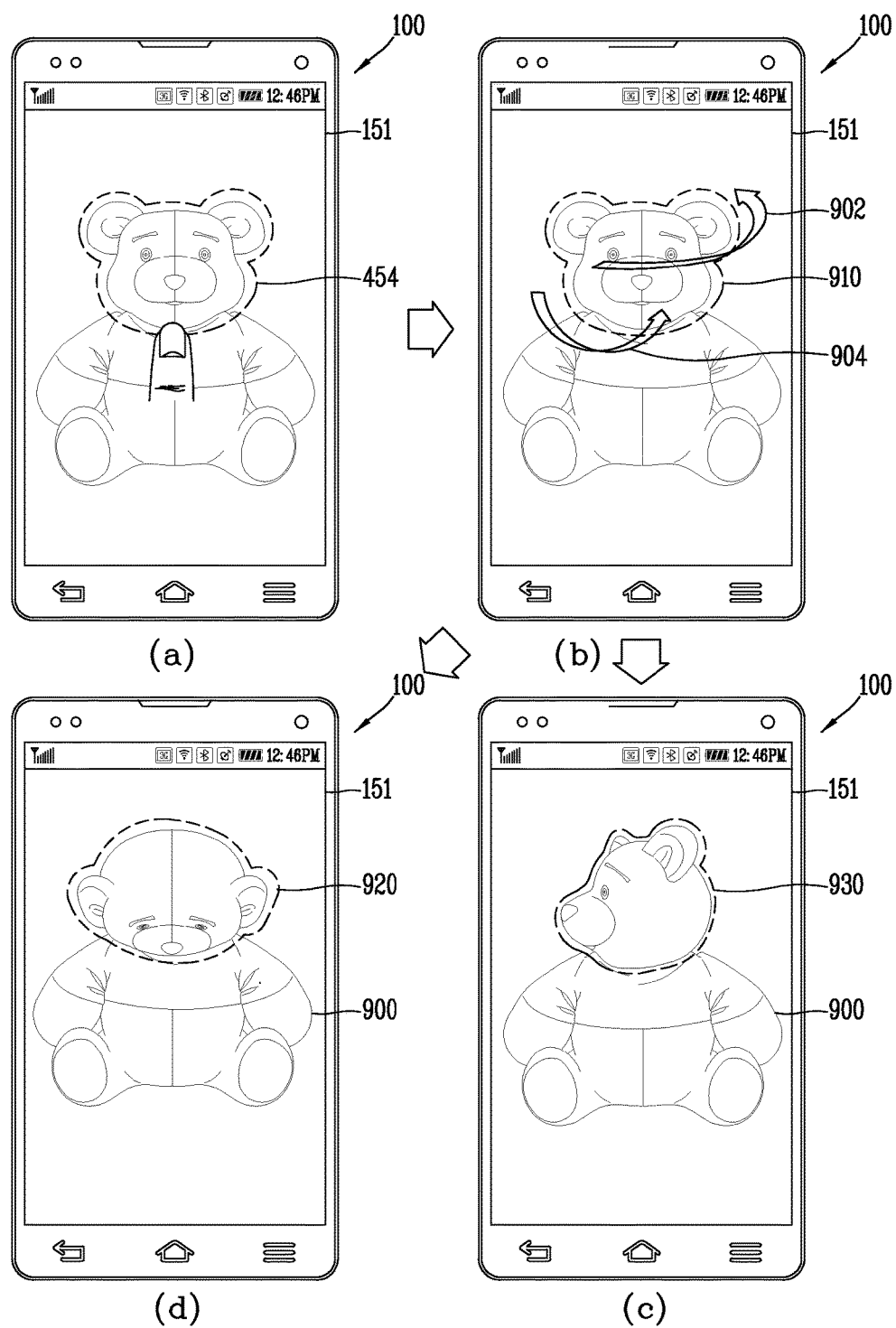

MOBILE TERMINAL AND CONTROL METHOD FOR THE MOBILE TERMINAL

CROSS-REFERENCE TO RELATED APPLICATIONS

This application is the National Stage filing under 35 U.S.C. 371 of International Application No. PCT/KR2014/003246, filed on Apr. 15, 2014 which claims the benefit of earlier filing date and right of priority to Korean Application No. 10-2013-0123518, filed on Oct. 16, 2013, the contents of which are all hereby incorporated by reference herein in their entirety.

TECHNICAL FIELD

The present disclosure relates to a mobile terminal that may take images and a control method for the mobile terminal.

BACKGROUND ART

A mobile terminal is configured to perform various functions. Examples of the various functions are a data and voice communication function, a function of capturing an image or a moving image of a photographic subject with a camera, a function of storing a voice, a function of playing back a music file using a speaker system, a function of displaying an image or video, and so on. Furthermore, the mobile terminal includes an additional function, such as playing a game and serves as a multimedia player. The recently-developed mobile terminal is capable of receiving multicast signals so that a user can view video or a television program with it.

In addition, efforts have been made to enhance the existing functions of the mobile terminal and additionally equip the mobile terminal with innovative functions. From a software or hardware perspective Efforts have also been made for structural changes to and modifications to constituent elements that make up the mobile terminal.

Also, in accordance with such improvement, the mobile terminal may be provided with a camera that includes a plurality of lenses, wherein the camera may receive and take images through each of the plurality of lenses.

DISCLOSURE OF INVENTION

Technical Problem

Therefore, an aspect of the detailed description is to provide a mobile terminal and a control method for the mobile terminal, in which a user may generate desired synthetic moving image data by using a plurality of images received through a camera provided with a plurality of lenses.

Solution to Problem

To achieve these and other advantages and in accordance with the purpose of this specification, as embodied and broadly described herein, a mobile terminal comprises a display module; a camera provided with a plurality of lenses; and a controller configured to receive images through the plurality of lenses and outputting the received images on the display module, wherein the controller generates one moving image data by using an image received from the first lens of the plurality of lenses and an image received from the second lens different from the first lens.

In one embodiment, if any one of the received images is selected, the controller takes the image received from the first lens corresponding to the selected image.

In one embodiment, if the second lens different from the first lens is selected in a state that the image received from the first lens is being taken, the controller takes the image received from the second lens subsequently to the image taken from the first lens.

In one embodiment, the controller ends taking the image received through the first lens to correspond to the case where the second lens is selected, and starts to take the image received through the second lens.

In one embodiment, a progress bar indicating the status that the moving image data is taken is output to at least one zone of the display module, the progress bar is divided into a plurality of sections on the basis of the number of lenses used to take the images constituting the moving image data, and preview images corresponding to any one of the images taken to generate the moving image data are output to the periphery of the plurality of sections.

In one embodiment, the generated moving image data are generated by arranging the images taken to generate the moving image data in accordance with the arranged position of the preview images.

In one embodiment, the output position of the preview images output on the progress bar is variable on the basis of selection of a user, and the controller changes the arrangement order of the images constituting the moving image data to correspond to the case where the position of the preview images is varied.

In one embodiment, if images start to be taken through any one of the plurality of lenses, an image currently taken is output to at least one zone of the display module.

In one embodiment, in a state that the image taken through the first lens is output to the at least one zone of the display module, if a touch of a predetermined mode is sensed for the at least one zone, the images starts to be taken through a lens having focused on a subject included in the zone where the touch is sensed.

In one embodiment, the controller extracts an image corresponding to the difference between the image received from the first lens and the image received from the second lens, and generates one moving image data by synthesizing the image corresponding to the difference with the periphery of the image received from the first lens.

In one embodiment, the second lens includes a plurality of lenses except for the first lens based on selection of a user.

In one embodiment, the controller takes the images received from the plurality of lenses and generates one moving image data by using at least two of the plurality of images, which are taken, after the images end to be taken.

In one embodiment, a progress bar indicating the status that the moving image data is generated is output to at least one zone of the display module, the progress bar is divided into a plurality of sections on the basis of the number of lenses used to take the images constituting the moving image data, and thumbnail images corresponding to any one of the images taken to generate the moving image data are output to the periphery of the plurality of sections.

In one embodiment, the controller partitions the display module into a plurality of zones, displays thumbnail images corresponding to each of the images taken from the plurality of lenses on the first zone of the plurality of zones, a plurality of thumbnail images selected from the preview images are displayed on the second zone of the plurality of zones, and generates one moving image data by arranging the corresponding taken images in accordance with the order of the thumbnail images displayed on the second zone.

In one embodiment, if any one of the thumbnail images displayed on the first zone is selected, the controller displays a graphic object for allowing at least a part of the taken images corresponding to the thumbnail images to be selected by a user, in the periphery of the selected thumbnail image, and extracts the part of the taken images, which is selected by the user, from the taken image corresponding to the selected thumbnail image.

In one embodiment, the controller generates one moving image data by arranging the taken images, which include the part of the taken images, in accordance with the order of the thumbnail images displayed on the second zone.

In one embodiment, the controller outputs the first image taken from the first lens among the plurality of lenses on the display module, and replaces at least a partial display zone of the first image with at least a partial display zone of the second image taken from at least one second lens different from the first lens on the basis of selection of a user.

In one embodiment, if at least one image zone of the first image is selected, the controller extracts at least one partial image from each of the second images taken by the plurality of second lenses, and synthesizes partial images, which are extracted from any one second image on the basis of selection of user among the partial images extracted from each of the second images, with at least one image of the first image except for the selected image zone.

In one embodiment, the controller displays thumbnail images respectively corresponding to the extracted partial images, in the periphery of the selected one zone.

In one embodiment, the controller outputs the first image taken from the first lens among the plurality of lenses on the display module, and replaces at least a partial display zone where the first image is displayed with at least a partial display zone of any one of another images, which are previously stored, on the basis of selection of a user.

In one embodiment, if at least partial display zone of the first image is selected, the controller extracts a feature point by recognizing the image included in the partial display zone, detects at least on moving image, which includes at least one image corresponding to the feature point, from the moving images, which are previously stored, and replaces the selected partial display zone of the first image with at least partial display zone of any one of the detected moving images.

In one embodiment, the controller outputs thumbnail images respectively corresponding to the detected moving images to at least a part on the display module.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

Advantageous Effects Of Invention

According to the mobile terminal and the control method for the mobile terminal, a user can be provided desired synthetic moving image data by using a plurality of images received through a camera provided with a plurality of lenses.

BRIEF DESCRIPTION OF DRAWINGS

FIG. 2d is a diagram illustrating an example of a camera provided with a plurality of lenses in a mobile terminal according to another embodiment of the present invention;

FIG. 2e is a diagram illustrating another example of a camera provided with a plurality of lenses in a mobile terminal according to another embodiment of the present invention;

FIG. 4 is a conceptional diagram illustrating an example of generating moving image data of FIG. 3;

FIG. 5 is a conceptional diagram illustrating an example of editing and taking images received through a plurality of lenses in accordance with a user's selection in a mobile terminal according to one embodiment of the present invention;

FIG. 6a is a conceptional diagram illustrating an example of generating moving image data by using an image received from a lens selected by position change of a mobile terminal in the mobile terminal according to one embodiment of the present invention;

FIGS. 8a and 8b are diagrams illustrating an example of generating an image obtained by synthesizing display zones with each other by using images received through a plurality of lenses in a mobile terminal according to one embodiment of the present invention;

FIG. 9 is a diagram illustrating an example of synthesizing a part of an image taken from a specific lens to a part of an image taken from another lens in accordance with a user's selection in a mobile terminal according to one embodiment of the present invention.

MODE FOR THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated. The suffixes attached to components of the wireless speaker, such as 'module' and 'unit or portion' were used for facilitation of the detailed description of the present invention. Therefore, the suffixes do not have different meanings from each other. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings. The technical idea of the present invention should be interpreted to embrace all such alterations, modifications, and variations in addition to the accompanying drawings.

The mobile terminal according to the present invention may include a smart phone, a laptop computer, a digital broadcasting terminal, a Personal Digital Assistant (PDA), a Portable Multimedia Player (PMP), a navigation system, a slate PC, a tablet PC, an ultra book, etc. However, it will be obvious to those skilled in the art that the present invention may be also applicable to a fixed terminal such as a digital TV and a desktop computer, except for specific configurations for mobility.

Figure 1:
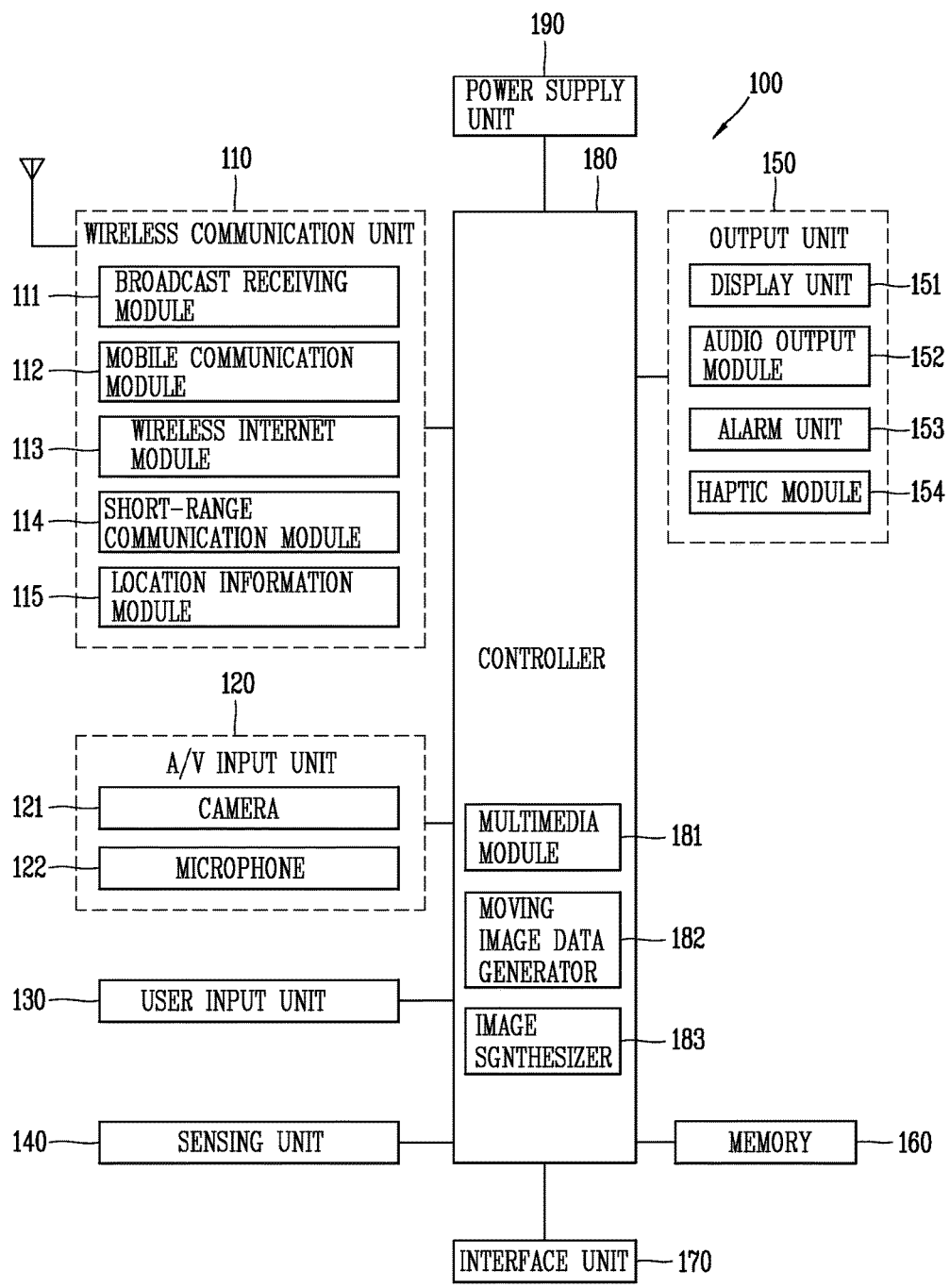
FIG. 1 is a block diagram illustrating a mobile terminal according to one embodiment of the present invention.

FIG. 1 is a block diagram of a mobile terminal according to an embodiment of the present invention.

As shown in FIG. 1, the mobile terminal 100 includes a radio communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. The mobile terminal 100 may be implemented by greater or fewer components.

Hereinafter, each of the above components will be explained.

The radio communication unit 110 typically includes one or more components to authorize radio communication between the mobile terminal 100 and a radio communication unit system or a network in which the mobile terminal 100 is located. For example, the radio communication unit 110 may include a broadcast receiving module 111, a mobile communication module 112, a wireless Internet module 113, a short range communication module 114, a location information module 115, etc.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and. In this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The mobile communication module 112 is configured to implement a video call mode and a voice call mode. The video call mode indicates a call performed while a user views counterpart, whereas the voice call mode indicates a call performed while a user does not view counterpart. For implementation of the video call mode and the voice call mode, the mobile communication module 112 is configured to transmit and receive at least one of voice data and image data.

The wireless Internet module 113 supports wireless Internet access for the mobile communication terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short range communication module 114 is a module for supporting short range communications. Some examples of short range communication technology include Bluetooth™, Radio Frequency IDentification (RFID), Infrared Data Association (IrDA), Ultra-WideBand (UWB), ZigBee™, and the like.

The location information module 115 is a module for acquiring a location (or position) of the mobile communication terminal. For example, the location information module 115 may include a GPS (Global Positioning System) module.

Referring to FIG. 1, the A/V input unit 120 is configured to receive an audio or video signal. The A/V input unit 120 may include a camera 121 and a microphone 122. The camera 121 processes image data of still pictures or video acquired by an image capture device in a video capturing mode or an image capturing mode. The processed image frames may be displayed on a display 151.

The image frames processed by the camera 121 may be stored in the memory 160 or transmitted via the radio communication unit 110. Two or more cameras 121 may be provided according to the configuration of the mobile communication terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of a user's touch (contact) with the mobile terminal 100 (e.g., touch inputs), the orientation of the mobile terminal 100, an acceleration or deceleration motion and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The sensing unit 140 may be provided with at least one sensor. For instance, the sensing unit 140 may be provided with an acceleration sensor, an inertia sensor and a gyro sensor. The sensing unit 140 may sense a current state of the mobile terminal 100, i.e., a moved degree of the mobile terminal 100, or a tilted state of the mobile terminal in a vertical direction or a horizontal direction based on the ground.

The sensing unit 140 may be provided with a pupil recognition sensor for sensing a user's eyes. In this case, the sensing unit 140 may sense a user's gaze direction by recognizing the user's pupils.

The output unit 150 is configured to provide outputs in a visual, audible, and/or tactile manner (e.g., audio signal, video signal, alarm signal, vibration signal, etc.). The output unit 150 may include the display 151, an audio output unit 152, an alarm unit 153, a haptic module 154, and the like.

The display 151 may display information processed in the mobile terminal 100. For example, when the mobile terminal 100 is in a phone call mode, the display 151 may display a User Interface (UI) or a Graphic User Interface (GUI) associated with a call. When the mobile terminal 100 is in a video call mode or image capturing mode, the display 151 may display a captured image and/or received image, a UI or GUI.

The display 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of these displays may be configured to be transparent so that outside may be seen therethrough, which may be referred to as a transparent display. A representative example of this transparent display may include a transparent organic light emitting diode (TOLED), etc. The mobile terminal 100 may include two or more displays 151. The rear surface portion of the display 151 may also be implemented to be optically transparent. Under this configuration, a user can view an object positioned at a rear side of a body through a region occupied by the display 151 of the body.

The display 151 may be implemented in two or more in number according to a configured aspect of the mobile terminal 100. For instance, a plurality of displays may be arranged on one surface integrally or separately, or may be arranged on different surfaces.

Here, if the display 151 and a touch sensitive sensor (referred to as a touch sensor) have a layered structure therebetween, the structure may be referred to as a touch screen. The display 151 may be used as an input device rather than an output device. The touch sensor may be implemented as a touch film, a touch sheet, a touch pad, and the like.

The touch sensor may be configured to convert changes of a pressure applied to a specific part of the display 151, or a capacitance occurring from a specific part of the display 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display 151 has been touched.

Referring to FIG. 1, a proximity sensor may be arranged at an inner region of the mobile terminal covered by the touch screen, or near the touch screen. The proximity sensor indicates a sensor to sense presence or absence of an object approaching to a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

In the following description, for the sake of brevity, recognition of the pointer positioned to be close to the touch screen without being contacted will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

The proximity sensor detects a proximity touch and a proximity touch pattern (e.g., a proximity touch distance, a proximity touch speed, a proximity touch time, a proximity touch position, a proximity touch motion state, or the like), and information corresponding to the sensed proximity touch operation and the proximity touch pattern can be output to the touch screen.

The audio output unit 152 may output audio data received from the radio communication unit 110 or stored in the memory 160 in a call signal reception mode, a call mode, a record mode, a voice recognition mode, a broadcast reception mode, and the like. Also, the audio output unit 152 may provide audible outputs related to a particular function (e.g., a call signal reception sound, a message reception sound, etc.) performed in the mobile terminal 100. The audio output unit 152 may include a receiver, a speaker, a buzzer, etc.

The alarm unit 153 outputs a signal for informing about an occurrence of an event of the mobile terminal 100. Events generated in the mobile terminal may include call signal reception, message reception, key signal inputs, and the like. In addition to video or audio signals, the alarm unit 153 may output signals in a different manner, for example, to inform about an occurrence of an event. For example, the alarm unit 153 may output a signal in the form of vibration. The video signal or audio signal may be output through the display 151 or the audio output unit 152. Therefore, the display 151 and the audio output unit 152 may be categorized as part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be output or sequentially output.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a map data, phonebook, messages, still images, video, etc.) that are input or output. The memory 160 may store data relating to various patterns of vibrations and sounds output when touch input to the touch screen is sensed.

The memory 160 may store images taken from a plurality of lenses if the camera 121 includes the plurality of lenses. In this case, the memory 160 may sequentially store the taken images in a horizontal direction or a vertical direction in accordance with a predetermined arrangement order.

For example, the order of the taken images may be defined in a horizontal direction or a vertical direction on the basis of the arrangement order of the plurality of lenses. In this case, the taken images may be stored in the memory 160 in accordance with the predetermined direction order.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

Here, the identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Once a preset condition of the mobile terminal is satisfied, the controlled 180 can execute a locked state for limiting a user's input of control commands with respect to applications. And, the controller 180 can control a locked screen displayed in the locked state, based on a touch input sensed by the display (hereinafter, will be referred to as 'touch screen' 151) in the locked state.

Also, the controller 180 may generate a synthetic image by using the plurality of images received or taken from the plurality of lenses if the camera 121 includes the plurality of lenses. For example, the controller 180 may generate one moving image data by using images received from at least two lenses in accordance with the user's selection.

The controller 180 may take an image received from a specific lens until the user selects another lens, and may take an image received from a lens selected by the user subsequently to the image taken through the specific lens, thereby generating one moving image data.

Also, in the middle of taking the image from any one lens selected by the user, the controller 180 may take an image received from another lens having another focus subsequently to the above taken image.

Also, the controller 180 may arrange at least two of the images taken from the plurality of lenses, that is, the taken images, in accordance with the user's selection and generate moving image data in accordance with the arranged order.

To this end, the controller 180 may include a moving image data generator 182, which may be provided inside the controller 180 or may be provided outside the controller 180 separately from the controller 180.

Also, the controller 180 may generate moving image data, which is obtained by synthesizing at least two images with each other, by replacing a part of a display area of an image taken from any one lens with a part of a display area of an image taken from another lens. For example, the controller 180 may replace a partial display area of an image obtained by taking a specific subject with a partial display area of an image taken from another focus. To this end, the controller 180 may include an image synthesizer 183, which may be provided inside the controller 180 or may be provided outside the controller 180 separately from the controller 180.

The power supply unit 190 receives external power or internal power and supplies appropriate power required for operating respective elements and components under control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Hereinafter, a structure of the mobile terminal of FIG. 1 according to an embodiment of the present invention will be explained.

Figure 2A:
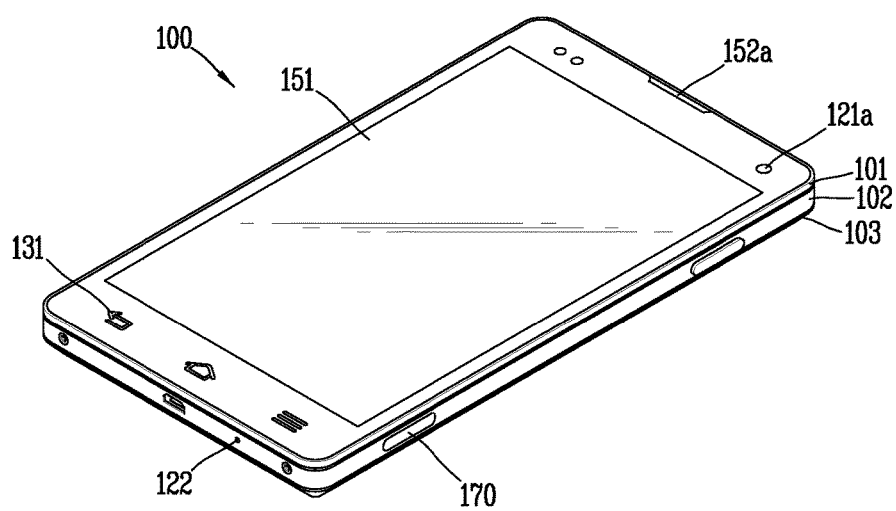
FIG. 2a is a front perspective diagram illustrating an example of a mobile terminal according to one embodiment of the present invention.
Figure 2B:
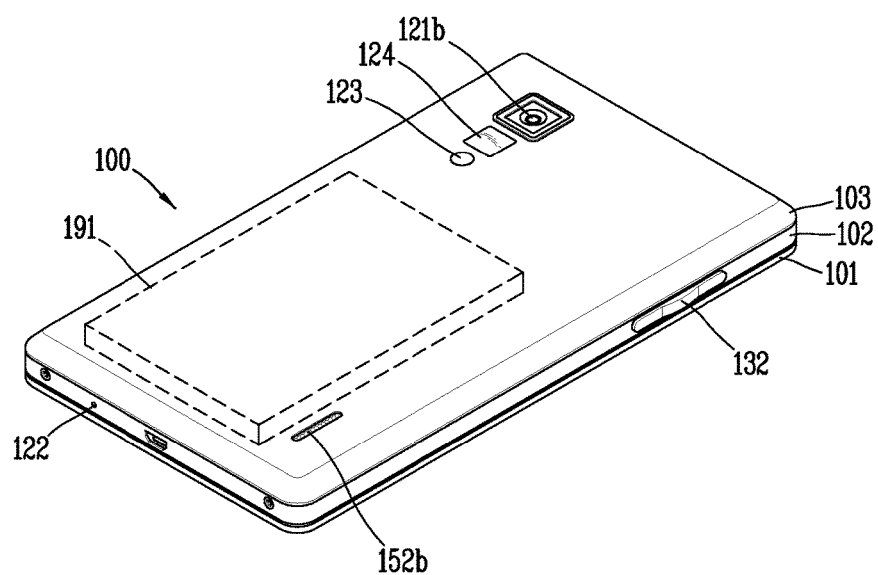
FIG. 2b is a rear perspective diagram illustrating an example of a mobile terminal according to one embodiment of the present invention.

FIG. 2A is a front perspective view of the mobile terminal according to an embodiment of the present invention, and FIG. 2B is a rear perspective view of the mobile terminal of FIG. 2A according to an embodiment of the present invention The mobile terminal 100 according to the present disclosure is a bar type mobile terminal. However, the present disclosure is not limited to this, but may be applied to a slide type in which two or more bodies are coupled to each other so as to perform a relative motion, a folder type, or a swing type, a swivel type and the like.

A terminal body (hereinafter, will be referred to as a body) is provided with a front surface, side surfaces and a rear surface. The body is provided with two ends in a lengthwise direction.

A case (casing, housing, cover, etc.) forming an outer appearance of the body 100 may include a front case 101 and a rear case 102. A space formed by the front case 101 and the rear case 102 may accommodate various components therein. At least one intermediate case may further be disposed between the front case 101 and the rear case 102.

Such cases may be formed by injection-molded synthetic resin, or may be formed using a metallic material such as stainless steel (STS) or titanium (Ti).

At the front case 101, may be disposed a display 151, an audio output unit 152, a camera 121, user input units 130, 131 and 132, a microphone 122, an interface unit 170, etc.

The display 151 occupies most parts of a main surface of the front case 101. The audio output unit 152 and the camera 121 are arranged at a region adjacent to one end of the stereoscopic display 151, and the first user input unit 131 and the microphone 122 are arranged at a region adjacent to another end of the display 151. The user input unit 131, the interface unit 170, etc. may be arranged on side surfaces of the front case 101 and the rear case 102. The microphone 122 is arranged at another end of the body 100.

The user input unit 130 is manipulated to receive a command for controlling the operation of the mobile terminal 100, and may include a plurality of manipulation units 131 and 132. The manipulation units 131 and 132 may be referred to as manipulating portions, and may include any type of ones that can be manipulated in a user's tactile manner.

Commands inputted through the first or second user input units 131 and 132 may be variously set. For instance, the first manipulation 131 is configured to input commands such as START, END, SCROLL or the like, and the second manipulation unit 132 is configured to input commands for controlling a level of sound outputted from the audio output unit 152, or commands for converting the current mode of the display 151 to a touch recognition mode.

Referring to FIG. 2B, a rear camera 121b may be additionally provided on the rear case 102. The rear camera 121b faces a direction which is opposite to a direction faced by the camera 121a (refer to FIG. 2a), and may have different pixels from the camera 121a.

For example, the camera 121a may operate with relatively lower pixels (lower resolution). Thus, the camera 121a may be useful when a user can capture his face and send it to another party during a video call or the like. In this case, the camera 121a can reduce the size of transmission data. On the other hand, the camera 121b may operate with a relatively higher pixels (higher resolution) such that it can be useful for a user to obtain higher quality pictures for later use. The cameras 121a and 121b may be installed at the body 100 so as to rotate or pop-up.

A flash 123 and a mirror 124 may be additionally disposed adjacent to the camera 121b. The flash 123 operates in conjunction with the camera 121b when taking a picture using the camera 121b. The mirror 124 can cooperate with the camera 121b to allow a user to photograph himself in a self-portrait mode.

An audio output unit 152b may be additionally arranged on a rear surface of the body. The audio output unit 152b may cooperate with the audio output unit 152a (refer to FIG. 2A) so as to implement a stereo function. Also, the audio output unit may be configured to operate as a speakerphone.

A power supply unit 190 for supplying power to the mobile terminal 100 is mounted to the body. The power supply unit 190 may be mounted in the body, or may be detachably mounted to the body.

Although not shown in the drawings, a touch pad 135 for sensing touch may be additionally mounted to the rear case 102. Like the display 151, the touch pad 135 may be formed to be light-transmissive. In this case, a rear display for outputting visual information may be additionally mounted to the touch pad 135. Information output from the display 151 (front display) and the rear display may be controlled by the touch pad 135. Alternatively, a display may be additionally mounted to the touch pad 135, and a touch screen may be arranged at the rear case 102.

The touch pad 135 operates in association with the display 151 of the front case 101. The touch pad 135 may be disposed on the rear surface of the display 151 in parallel. The touch pad 135 may have a size equal to or smaller than that of the display 151.

Figure 2C:
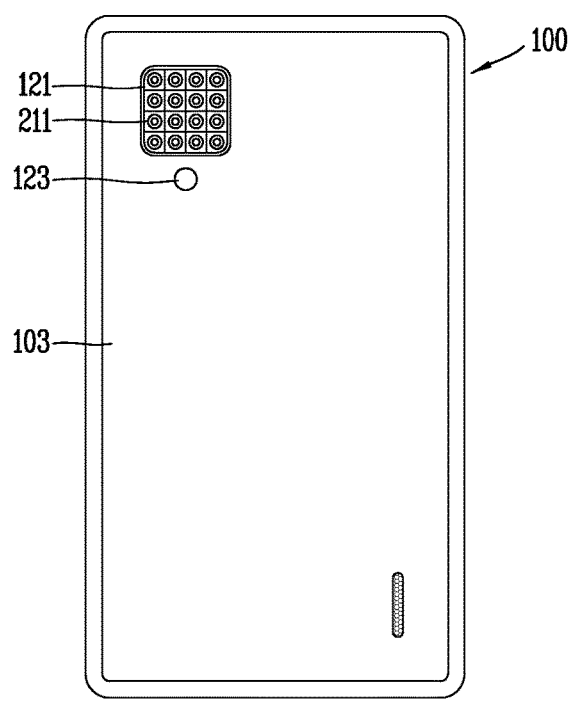
FIG. 2c is a rear perspective diagram illustrating an example of a mobile terminal according to another embodiment of the present invention.

Also, the mobile terminal according to one embodiment of the present invention, which may include at least one or more of the aforementioned elements, may include a camera 121 provided with a plurality of lenses arranged along a plurality of lines as shown in FIG. 2c. The camera provided with a plurality of lenses may be referred to as an 'array camera'. As shown, the array camera may be provided in such a manner that a plurality of lenses are arranged in a matrix arrangement.

The plurality of lenses of the array camera may be arranged on a plane or a curve. Also, the plurality of lenses may be arranged on a curve formed to be concave inside a rear case 102 of the mobile terminal 100, or may be arranged on a curve formed to be convex outside the rear case 102.

FIGS. 2d and 2e illustrate examples of the array camera 121.

First of all, referring to FIG. 2d, the plurality of lenses may be arranged along a curve of which a plurality of lines in either a horizontal direction or a vertical direction are formed to be concave as shown in (a) and (b) of FIG. 2d. Also, the plurality of lenses may be arranged along a curve, that is, a spherical surface, of which a plurality of lines in either a horizontal direction or a vertical direction are formed to be concave as shown in (c) of FIG. 2c.

In this way, if the plurality of lenses are arranged along the curve, angles of coverage for taking a subject from the respective lenses may be different from one another. For example, in case of (a) of FIG. 2d, although an angle of coverage in a vertical direction of a lens 'a' 211 is the same as that of a lens 'b' 212, angles of coverage in a vertical direction of a lens c 213, the lens 'a' 211 and the lens 'b' 212 may be different from one another. Also, in case of (c) of FIG. 2c, although an angle of coverage in a horizontal direction of the lens 'a' 211 is the same as that of the lens 'c' 213, angles of coverage in a horizontal direction of the lens 'b' 212, the lens 'a' 211 and the lens 'c' 213 may be different from one another.

Also, if the plurality of lenses are arranged along the plurality of lines of a spherical surface formed to be concave as shown in (c) of FIG. 2d, angles of coverage in a horizontal direction and angles of coverage in a vertical direction of all the lenses may be different from one another. Accordingly, the controller 180 may take a plurality of images taken from different angles, and the plurality of images may be used to synthesize new images changed on the basis of the user's selection.

Similarly to FIG. 2d, the plurality of lenses may be arranged along the plurality of lines formed as a convex curve or a spherical surface. FIG. 2e illustrates an example of the plurality of lenses arranged along the plurality of lines formed as a convex curve or a spherical surface.

In the same manner as FIG. 2d, even in case that the plurality of lines are formed as a convex curve or a spherical surface, angles of coverage for taking a subject from the respective lenses may be different from one another. However, since the plurality of lenses are arranged to be concave in case of FIG. 2d, the angles of coverage of the respective lenses are converged towards a specific subject. On the other hand, since the plurality of lenses are arranged to be convex in case of FIG. 2e, the angles of coverage of the respective lenses may radially be distributed towards a specific subject.

The arrangement of the plurality of lenses shown in FIG. 2d or 2e are only an example of lens arrangement of the array camera that may be formed as a curve or spherical surface, and the present invention is not limited to the example of FIG. 2d or 2e. In other words, the plurality of lenses of the array camera may be arranged in various manners which are not shown in FIGS. 2d and 2e, within the scope of the present invention.

Figure 3:
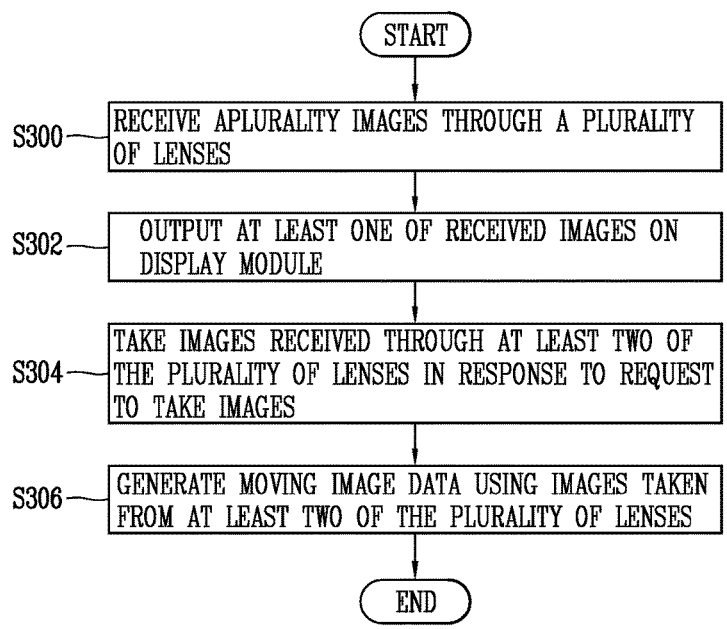
FIG. 3 is a flow chart illustrating a method for generating one moving image data by using a plurality of images received through a plurality of lenses in a mobile terminal according to one embodiment of the present invention.

FIG. 3 is a flow chart illustrating a method for generating one moving image data by using a plurality of images received through a plurality of lenses in a mobile terminal according to one embodiment of the present invention.

Referring to FIG. 3, the controller 180 receives images through a plurality of lenses in accordance with the user's selection (S300). In this case, the images may be received if a function for taking images is carried out or if the camera 121 is activated. The function for taking images may be carried out if a camera application is activated. The camera application may be activated if an icon (graphic object) of a camera related application output on the display module 151 is selected.

Also, if the function for taking images is carried out (or if the camera 121 is activated), the controller 180 may receive images through all of the plurality of lenses or at least one of the plurality of lenses, when the camera 121 is activated, in accordance with camera related setting information. Hereinafter, the embodiment corresponding to the case where the images are received through all of the plurality of lenses arranged in the camera will be described.

Meanwhile, as described with reference to the step S300, if the images are received through the plurality of lenses, at least one of the received images may be output on the display module 151 in a predetermined arrangement (S302). For example, the controller 180 may display the image received from any one of the plurality of lenses, which is selected by the user, on the entire screen of the display module 151.

Alternatively, the controller 180 may arrange the plurality of images to correspond to the position where the lens is arranged. For example, the controller 180 may output the image to the position corresponding to the sixteenth lens (no. 16) 211 of the plurality of lenses arranged in the camera 121, wherein the image is received through the sixteenth lens (no. 16) 211. In this way, the controller 180 may output the images received from the respective lenses on the display module 151 by arranging the images to correspond to the position where the respective lenses are arranged. In other words, the images may be output on the display module 151 in accordance with a predetermined arrangement corresponding to the order of the plurality of lenses arranged in the camera 121.

As a result, the controller 180 may partition the display module 151 into a plurality of zones to correspond to the number of the plurality of lenses, and may output any one of the images received through the plurality of lenses to each of the plurality of zones. For example, if the number of lenses is 16, the controller 180 may partition the display module into 16 zones and output different images to the 16 partitioned zones. In this case, the different images may be the images received through the respective lenses different from one another.

Meanwhile, at the step S302, the images output on the display module 151 may be preview images. In this case, the 'preview images' may be the images simply received through the plurality of lenses before a request for taking the images received through the camera 121 is received. In this case, the preview images may not be stored in the memory 160 until the request is received. Accordingly, the preview images may be changed as the focus of the camera is changed, whereby the image on the display module 151 may be changed in real time.

As described above, if the request for taking the images is received in a state that the images input through the plurality of lenses are output on the display module 151, the images received through the plurality of lenses may be taken in response to the request (S304). In this case, "taking the images" may mean that the images input through the camera (or lens) are stored in the memory 160 at the time when the request for taking the images is received or at another time corresponding to the time when the request is received.

If the plurality of images are stored in the memory 160, the step S306 of generating one moving image data by using the images taken from at least two of the plurality of lenses on the basis of the user's selection may be performed.

Also, the step S304 and the step S306 may be the steps of generating any one moving image data by taking images from at least two of the plurality of lenses in due order in accordance with the order selected by the user.

For example, at the steps 304 and S306, the controller 180 may take the image received from any one lens until the user selects another lens, and if the user selects another lens, may take the image received from the latter lens selected by the user subsequently to the image taken through the former lens, thereby generating one moving image data. Alternatively, in the middle of taking the image from any one lens in accordance with the user's selection, the controller 180 may take the image received from the lens having another focus subsequently to the image being taken from any one lens selected by the user.

(a) and (b) of FIG. 4 are conceptional diagrams illustrating an example of generating moving image data at the step S306. For convenience of description, it is assumed that the screen shown in (a) and (b) of FIG. 4 shows that images received from 9 of a plurality of lenses are output on the display module 151. In this case, the number of images output on the display module 151 may be changed depending on the user's selection, a size of a predetermined screen of the display module 151, or the number of the plurality of lenses.

Referring to (a) of FIG. 4, the images received from the plurality of lenses are displayed on the display module 151. In this case, as shown in (b) of FIG. 4, the user may select the images received from at least two lenses (for example, the first lens and the ninth lens), thereby generating one moving image data from the images received from the selected lenses.

In this case, if the first lens is selected by the user, the controller 180 may take an image 400 received from the first lens until the ninth lens is selected. And, if the ninth lens is selected, the controller 180 may take an image 402 received from the ninth lens subsequently to the image taken from the first lens. Accordingly, one moving image data, which include the image taken from the first lens until the ninth lens is selected and the image taken from the ninth lens after the ninth lens is selected, may be generated. In other words, the images 410 and 412 constituting the moving image data may be the images received from the respective lenses different from each other on the basis of the time when another lens is selected, that is, the time when the ninth lens is selected.

Alternatively, at the step S306, the controller 180 may generate the moving image data in accordance with the arrangement order of at least two images selected by the user among the images stored in the memory 160. In this case, the controller 180 may output the plurality of images taken from the plurality of lenses on the display module 151 as shown in (a) of FIG. 4.

And, at least two of the plurality of images output on the display module 151 may be arranged by the user's selection to generate one moving image data. (a) of FIG. 4 illustrates this example.

Referring to (b) of FIG. 4, if the user selects the image 400 taken from the first lens and subsequently selects the image 402 taken from the ninth lens, the controller 180 may generate one moving image data by connecting the image 400 taken from the first lens with the image 402 taken from the ninth lens. In other words, the moving image data may be generated to include the image 410 taken from the first lens and the image 412 taken from the ninth lens, and the order of the images included in the moving image data may be changed in accordance with the user's selection.

Also, at the step S306, the controller 180 may generate moving image data, which is obtained by synthesizing at least two images with each other, by replacing a part of a display zone of the image taken from any one lens with a part of a display zone of the image taken from another lens.

In this case, an example of generating the moving image data at the step S306 is shown in (c) and (d) of FIG. 4.

As described above, the plurality of lenses according to the present invention may be formed along a plurality of lines of a convex curve or a concave curve. In this case, the plurality of lenses may take the same subject at their respective focus angles different from one another. And, the controller 180 may replace a part of a display zone of the image taken from any one lens with a part of a display zone corresponding to the image obtained by taking the same subject at another focus angle for the same subject, in accordance with the user's selection.

For example, as shown in (c) of FIG. 4, the controller 180 may output graphic objects 450 and 452 on the screen to correspond to the user's selection. If any one of the graphic objects is selected, the controller 180 may replace a part of the image taken from any one lens with a part of the image taken at a focus angle corresponding to the selected object. (d) of FIG. 4 illustrates this example.

For example, if the focus angle of any one lens corresponds to a front side of the subject, the image obtained by taking the front side of the subject may be output on the screen as shown in (c) of FIG. 4. If a part of the display zone of the output image is selected by the user (454), the graphic objects 450 and 452 may be output.

If any one of the graphic objects 450 and 452, for example, the graphic object 452 is selected, the controller 180 may replace the image of the display zone of the part 454 selected by the user in (c) of FIG. 4 with a part 456 of the display zone of the image taken at a focus angle corresponding to the graphic object 452 as shown in (d) of FIG. 4.

Hereinafter, a method for generating moving image data obtained by arranging a plurality of images received or taken through a plurality of lenses in accordance with a user's selection or synthesizing a part of the plurality of images with another image in a mobile terminal according to the embodiment of the present invention will be described in more detail with reference to the accompanying drawings.

FIG. 5 is a conceptional diagram illustrating an example of editing and taking images received through a plurality of lenses in accordance with a user's selection in a mobile terminal according to one embodiment of the present invention.

As described above, the mobile terminal 100 according to one embodiment of the present invention may output the images received from each of the plurality of lenses on the display module 151. In this case, the images output on the display module 151 may be preview images. In other words, the images output on the display module 151 may be the images which are not stored in the memory 160.

Also, a zone for displaying a progress bar indicating the status that moving image data currently generated is taken may be formed at a part of the display module 151 of the mobile terminal 100 according to the embodiment of the present invention. In this case, the progress bar may be formed as a graphic object such as a bar graph or a graph type similar to the graphic object. Alternatively, the progress bar may be configured to display the images for generating the moving image data. In this case, the progress bar may be divided into a plurality of sections on the basis of the number of lenses used for taking the images constituting the moving image data, and the images constituting the moving image data or their preview images may be output to each section.

(a) of FIG. 5 illustrates an example of the display module 151 that includes a zone 550 for displaying the progress bar and the images received from each of the plurality of lenses.

As shown in (a) of FIG. 5, in a state that the preview images are output, the controller 180 may sense an input of the user for any one of the images. For example, the controller 180 may partition the display module 151 into a plurality of zones as shown in (a) of FIG. 5 and output the images received from respective lenses different from one another to each zone. If the user selects any one of the images displayed on the display module 151, the controller 180 may determine that the lens for taking the selected image has been selected. In this case, the user's selection may be made if a touch input of the user is sensed in a zone where any one of the images displayed on the display module 151 is displayed.

(b) of FIG. 5 illustrates this example. Referring to (b) of FIG. 5, if the user selects an image 500 taken from the first lens, the controller 180 may determine that the first lens has been selected. Also, the controller 180 may start to take the image received from the selected first lens. An image 510 taken from the lens selected by the user may be displayed in a zone 550 for displaying the progress bar as shown in (b) of FIG. 5.

The controller 180 may continue to take the image received from the first lens until the user selects another lens. If the user selects another lens different from the currently selected lens, that is, the first lens, the controller 180 may take the image received from another lens selected by the user subsequently to the image which is currently taken.

(c) of FIG. 5 illustrates this example. Referring to (c) of FIG. 5, it is assumed that the user selects an image 502 received from the fifth lens after selecting the image 500 received from the first lens.

In this case, if the image 502 received from the fifth lens is selected, the controller 180 may determine that taking the image received from the fifth lens has been requested from the user. The controller 180 may end taking the image received from the lens which is previously selected if the lens requested by the user to take the image is different from the lens which is previously selected, and may take an image received from the lens requested to newly take the image. In this case, the controller 180 may take the image received from the lens requested to newly take the image, subsequently to the image taken from the lens which is previously selected. Accordingly, the moving image data including the image taken from the first lens may be generated before the fifth lens is selected, and the moving image data including the image taken from the fifth lens may be generated after the fifth lens is selected.

The status that the moving image data is taken may be displayed through the progress bar. For example, subsequently to the image 510 taken from the first lens, the image 512 taken from the fifth lens may be output on the zone 550 where the progress bar is displayed. In this case, the image 510 taken from the first lens or the image 512 taken from the fifth lens may be output in the zone 550 where the progress bar is displayed, in the form of the preview image.

Meanwhile, although the moving image data may be generated in such a manner that the images are taken sequentially by changing the lens in accordance with the order selected by the user, the image taken from a specific lens in accordance with the user's selection may be inserted into the moving image data which is already taken, at a specific time.

For example, the controller 180 may take the image received from the lens currently selected by the user until another lens is selected or generation of the moving image data ends, and may insert the taken image between two images of the moving image data, which are selected by the user. In this case, the controller 180 may arrange the inserted images between the two images selected by the user and generate the moving image data in accordance with the arranged order.

(d) of FIG. 5 illustrates this example. Referring to (d) of FIG. 5, if an image 504 received from the seventh lens is selected by the user, the controller 180 may determine that taking the image received from the seventh lens has been requested. If a touch and drag input of the user, which is intended to locate the image 504 received from the seventh lens between the images 510 and 512 output to the zone 550 for displaying the progress bar, is sensed, the controller 180 may determine that insertion of the image taken from the seventh lens between the images 510 and 512 constituting the moving image data is selected.

In this case, the controller 180 takes the image received from the seventh lens, and takes the image received through the seventh lens subsequently to the time when the image 510 taken from the first lens ends. If another lens different from the lens currently selected by the user is selected, or if generation of the moving image data ends, the controller 180 ends taking the image received from the seventh lens and connects the image 512 taken from the fifth lens, among the images constituting the moving image data, to the image taken from the seventh lens at the time when the image taken from the seventh lens ends.

Accordingly, the moving image data may be generated in such a manner that the image 514 taken from the seventh lens may be connected to the image 510 taken from the first lens and then the image 512 taken from the fifth lens may be connected to the image 514 taken from the seventh lens. As a result, the status that the moving image data is generated by insertion of the image 514 taken from the seventh lens between the images 510 and 512 constituting the moving image data may be output to the zone 550 where the progress bar is displayed.

Meanwhile, although it is assumed that the image taken from the specific lens is inserted in (d) of FIG. 5, at least one of the images output to the zone 550 where the progress bar is displayed may be deleted in accordance with the user's selection. In this case, the controller 180 may generate the moving image data by connecting the images before and after the image is deleted with each other. In other words, the controller 180 may generate the moving image data in accordance with the arrangement order of the images taken to constitute the moving image data, and the arrangement order of the images may be changed in accordance with the user's selection.

The controller 180 may insert the image taken from the specific lens between the arranged images as shown in (d) of FIG. 5, or may delete at least one of the arranged images. Such insertion or deletion of the image may be performed by direct selection (for example, touch of the image received or taken from the specific lens) of the user or change of the position of the mobile terminal 100.

For example, if the user swings the mobile terminal 100 as much as the number of predetermined times or strength stronger than predetermined strength, the arrangement order of the images may be changed. For example, if the user swings the mobile terminal 100, the images arranged in the zone 550 where the progress bar is displayed may be arranged in the ascending or descending order of the lenses.

Also, if the user moves or rotates the mobile terminal 100 in any one of up, down, left and right directions, any one of the plurality of lenses may be selected in accordance with a moving direction, a rotation direction or a moving level of the mobile terminal 100.

For example, the controller 180 may sense position change or rotation of the mobile terminal 100 by using an acceleration sensor, an inertial sensor, a gyro sensor. Also, the controller 180 may determine that any one lens has been selected by the user in a changed direction of the position or a direction corresponding to the rotated direction in accordance with a changed level of the position or a rotated level of the direction.

If any one of the plurality of lenses is selected in accordance with a moving direction, a rotation direction or a moving level of the mobile terminal 100, the controller 180 may generate the moving image data by taking the image received from the lens selected in accordance with the moving direction or the moving level subsequently to the image taken from the lens which is previously selected.

For example, as described above, the mobile terminal 180 may generate the moving image data including the images taken from at least two lenses by allowing another lens different from the currently selected lens to be selected using position change or rotation.

FIG. 6a illustrates this example.

If a specific lens is selected by the user, the controller 180 may determine that taking the image received from the selected lens has been requested. For example, if the lens, which receives a front image of a subject 100, is selected, the image shown in (a) of FIG. 6a may be output on the display module 151.

In this state, if the user rotates the mobile terminal 100 to the right side at a predetermined angle (for example, 45°, or if the user moves the mobile terminal 100 to the right side at a constant distance or more, the controller 180 may sense rotation or position change of the mobile terminal 100 through the inertia sensor, the acceleration sensor, and the like. Also, the controller 180 may select any one of the plurality of lenses on the basis of the rotated status or the changed position. In this case, the controller 180 may select the lens corresponding to the rotated angle or the rotated time in the rotated direction or the lens corresponding to the position changed distance or the position changed time in the position changed direction.

If the specific lens is selected in accordance with the rotated status or the position changed status, the controller 180 may end the status that the image of the lens which is previously selected is taken. And, the controller 180 may start to take the image received from the lens selected in accordance with the rotated status or the position change. The taken image may be output on the display module 151 as shown in (b) of FIG. 6a.

Referring to (b) of FIG. 6a, it is noted that the image corresponding to the status that the subject 600 is rotated as much as a predetermined angle is output on the display module 151. This is because that it is assumes that the camera 121 of the mobile terminal 100 according to the embodiment of the present invention includes a plurality of lenses arranged along a plurality of lines. Accordingly, angles of coverage for each lens are different from one another in view of features of the lenses arranged along a curve. As a result, if different lenses are selected, the moving image data including the images taken at different focus angles may be generated.

For example, the moving image data generated in case of (b) of FIG. 6a may include the image taken at a front angle of the subject 600 before the user rotates the mobile terminal 100 or changes the position of the mobile terminal 100, and the image taken at an angle of the subject 600 rotated as much as a predetermined angle from the right side after the user rotates the mobile terminal 100 or changes the position of the mobile terminal 100.

Meanwhile, if it is assumed in (b) of FIG. 6a that the lens corresponding to the case where the mobile terminal 100 is rotated in a left and right direction or moves in a left and right direction is selected, it is assumed in (c) of FIG. 6a that the lens corresponding to the case where the mobile terminal 100 is rotated in a forward or backward direction or moves in an upward and downward direction is selected. In this case, if the user rotates the mobile terminal 100 in a forward direction, that is, inclines the mobile terminal 100 at a predetermined angle or more in a forward direction, or if the user moves the mobile terminal 100 in an upward direction at a constant distance or more, the image obtained by taking the subject 600 in an upward direction as much as a predetermined angle as shown in (c) of FIG. 6a may be output on the display module 151.

Meanwhile, the controller 180 of the mobile terminal 100 according to the embodiment of the present invention may generate the moving image data by taking the image received from the lens corresponding to a specific focus angle selected by the user subsequently to the image which is previously taken.

For example, the controller 180 may take the image received from any one of the plurality of lenses and output the taken image on the display module 151. If the specific focus angle is selected by the user, the controller 180 may end currently taking the image from the lens and take the image received from the lens corresponding to the selected focus angle subsequently to the image which is taken.

In this case, the controller 180 may be provided with the specific focus angle directly selected by the user through a key pad or jog key. However, unlike this, if the user selects a specific subject included in the image output on the display module 151, the controller 180 may determine that the lens which is focused on the corresponding subject has been selected.

Figure 6B:
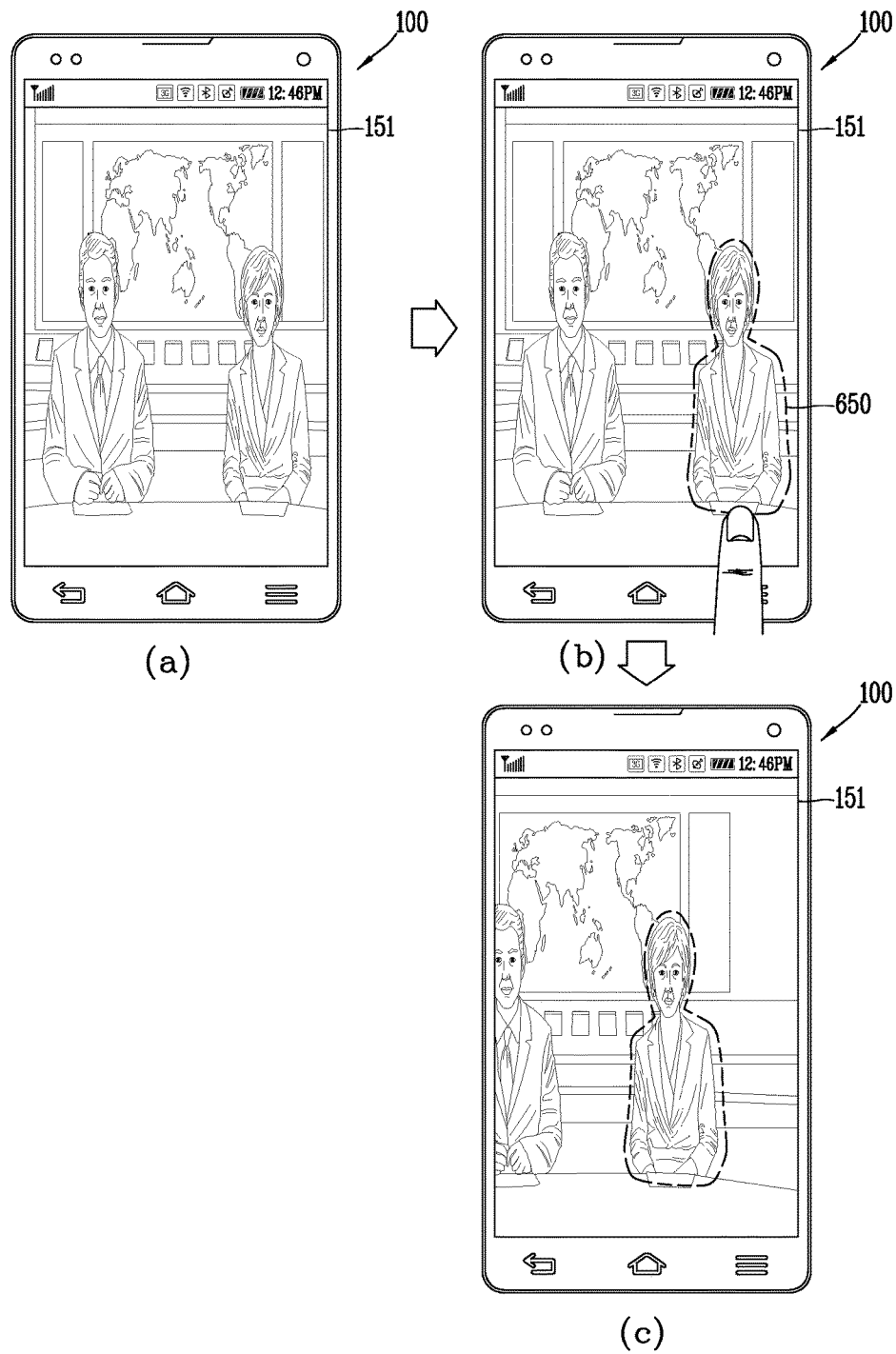
FIG. 6b is a conceptional diagram illustrating an example of generating moving image data from a lens which receives images of a subject through different focuses in a mobile terminal according to one embodiment of the present invention.

FIG. 6b is a conceptional diagram illustrating an example of generating moving image data from a lens, which receives an image of a subject at different focuses, in a mobile terminal according to one embodiment of the present invention.

Referring to FIG. 6b, as shown in (a) of FIG. 6b, the controller 180 may take the image received from any one of the plurality of lenses and output the taken image to the display module 151.

As shown in (b) of FIG. 6b, at least a partial zone on the display module 151 to which an image 650 of the specific subject is output may be selected by the user. For example, if a touch input or touch and drag input of the user is sensed in the zone of the display module 151 to which the specific subject 650 is output, the controller 180 may determine that the specific subject 650 has been selected.

If it is determined that the specific subject is selected by the user, the controller 180 may select the lens, which is focused on the specific subject 650, among the plurality of lenses. And, the controller 180 ends image-taking of the lens, which currently takes the image output on the display module 151, and takes the image received from the lens which is focused on the specific subject 650. Also, the controller 180 outputs the image, which is currently taken, on the display module 151.

(c) of FIG. 6b illustrates this example. Referring to (c) of FIG. 6b, it is noted that the subject 650 output to be inclined to the right side in (a) and (b) of FIG. 6b is output to the center on the display module 151. This is because that the lens which is focused on the subject has been selected and the image received from the selected lens has been taken and output on the display module 151 as the user has selected the subject 650 in (b) of FIG. 6b.

As described above, the controller 180 of the mobile terminal 100 according to the embodiment of the present invention may generate one moving image data by taking the image received from the lens which is focused on the selected subject, subsequently to the image which is taken before the specific subject included in the image output on the display module 151 is selected by the user. Accordingly, the moving image data may include the images taken from at least two lenses having their respective focus angles different from each other on the basis of the time when the subject is selected by the user.

Meanwhile, in the aforementioned embodiments, if at least one of the images received from each of the plurality of lenses is output on the display module 151 and there is a request for taking the image, that is, if any one lens is selected, it is assumed that the image received from the selected lens is taken. However, unlike the aforementioned embodiments, one moving image data may be generated using the images which have been already taken.

Figure 7:
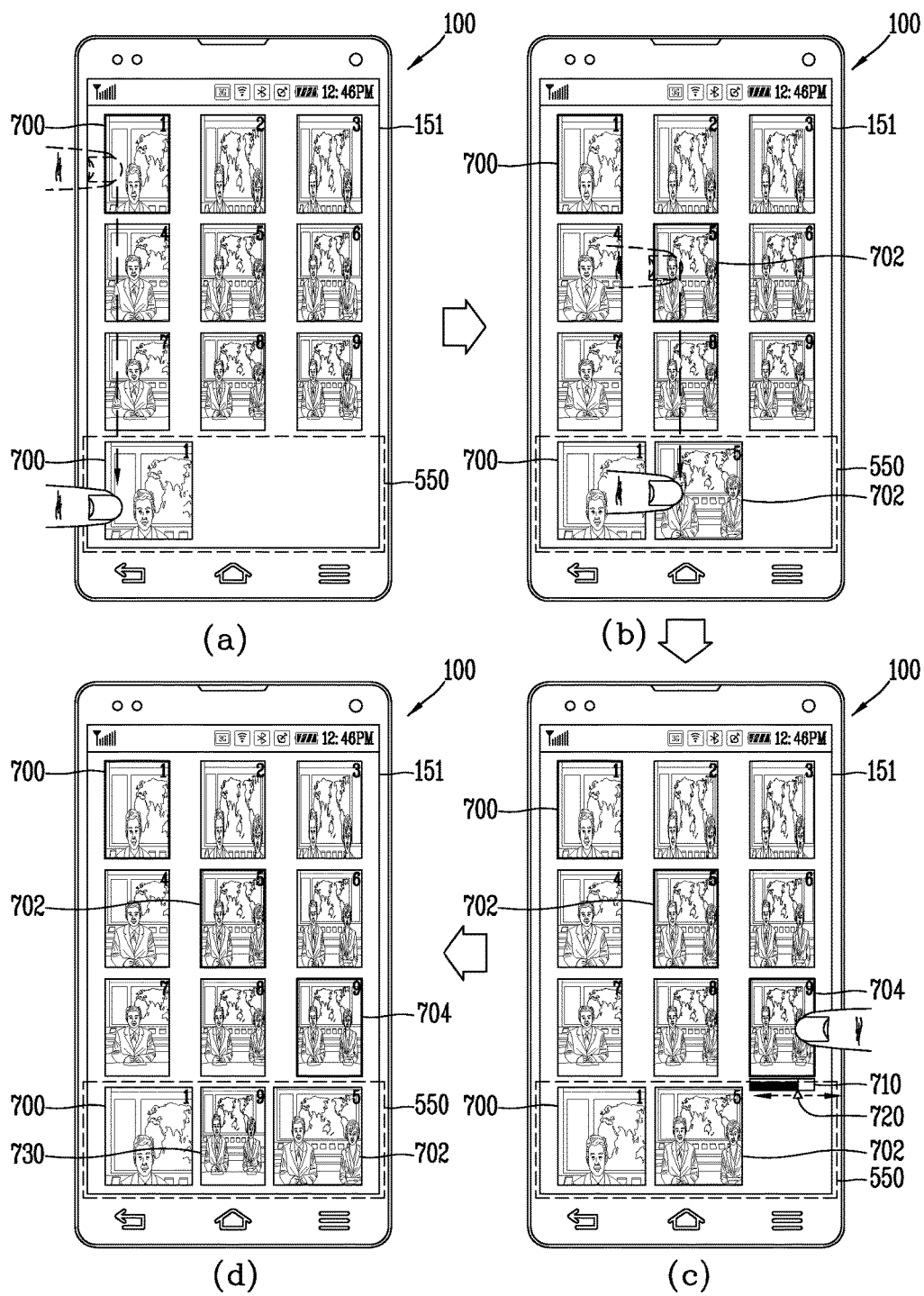
FIG. 7 is a diagram illustrating an example of generating one moving image data by editing images taken from a plurality of lenses in a mobile terminal according to one embodiment of the present invention.

FIG. 7 is a diagram illustrating an example of generating one moving image data by editing images taken from a plurality of lenses in a mobile terminal according to one embodiment of the present invention.

The controller 180 may respectively output a plurality of images taken from a plurality of lenses in accordance with the user's selection to a plurality of zones partitioned on the display module 151. In this case, instead of the plurality of images, thumbnail images generated from each of the plurality of images may be output.

If an image (or thumbnail image) output to any one of the plurality of zones is selected by the user, the controller 180 may output the selected image to the zone 550 where the progress bar for indicating the generated status of the moving image data is displayed.

FIG. 7a illustrates this example. Referring to FIG. 7a, if an image 700 taken from the first lens is selected by the user, the controller 180 may output the image 700 taken from the first lens to the zone 550 where the progress bar is displayed.

In this case, the controller 180 may output an image, which may represent the image 700 taken from the first lens, instead of the image 700 taken from the first lens, to the zone 550 where the progress bar is displayed. In this case, a thumbnail image generated from the image taken from the first lens may be the image that may represent the image 700 taken from the first lens.

If the user selects the image taken from another lens, the controller 180 may generate one moving image data by connecting the selected image to the image 700 taken from the first lens. (b) of FIG. 7 illustrates this example.

Referring to (b) of FIG. 7, if the user selects an image 702 taken from the fifth lens in a state that the image 700 taken from the first lens is selected, the controller 180 may output the image 702 (or thumbnail image) taken from the fifth lens to the zone 550 where the progress bar is displayed, subsequently to the image 700 (or thumbnail image) taken from the first lens. The controller may generate one moving image data by arranging the images or thumbnail images in due order on the zone 550 where the progress bar is displayed. Accordingly, as shown in (b) of FIG. 7, the moving image data may be generated in such a manner that the image 702 taken from the fifth lens is output subsequently to the image 700 taken from the first lens.

As shown in (a) and (b) of FIG. 7, the controller 180 may generate one moving image data by arranging and connecting the images taken from the plurality of lenses in accordance with the order based on the user's selection. However, in case of the images which have been already taken, the moving image data may be generated by extracting some of the taken images in accordance with the user's selection.

For example, if the user selects any one of the images taken from the plurality of lenses, the controller 180 may display a graphic object in the periphery of the selected image, wherein the graphic object allows the user to select a part of the selected image. The controller 180 may extract the partial image selected through the graphic object from the taken images, and may allow the extracted image to be included in one of the images constituting the moving image data.

(c) and (d) of FIG. 7 illustrate this example.

Referring to (c) of FIG. 7, if the user selects the image 704 taken from the ninth lens, the controller 180 may display a graphic object 710 in the periphery of the selected image (for example, the image taken from the ninth lens), wherein the graphic object 710 allows the user to select at least a part of the selected image 704.

The controller 180 may allow only a part of the currently selected image to be selected by the user by using the graphic object 710 and extract the selected part. The controller 180 may select at least a part of the taken image in accordance with a touch and drag input of the user at the state that the graphic object 710 is displayed or a touch of the user for any one point of the zone where the graphic object 710 is displayed. Alternatively, at least a part of the taken image may be selected to correspond to the case where a separate graphic object 720 moves in the periphery of the graphic object 710.

Also, the part of the image determined in accordance with the touch and drag input of the user or a touch for a specific point may be displayed in the graphic object 710 as shown in (c) of FIG. 7.

Also, the graphic object 710 may be intended to receive a specific time interval. For example, the graphic object 710 may be related to a play time of the image taken from the ninth lens. In this case, the controller 180 may select some time interval of the play time of the image taken from the ninth lens by performing a touch and drag input or touching a point of the zone where the graphic object 710 is displayed as shown in (c) of FIG. 7. A part of the image taken from the ninth lens, which corresponds to the selected time interval, may be selected.

If a part of the taken image is selected through the graphic object 710, the controller 180 extracts the selected partial image from the taken image. The extracted image may be arranged together with another images output to the zone 550 where the progress bar is displayed.

Meanwhile, the extracted partial image may be displayed differently from another images output to the zone 550 where the progress bar is displayed. For example, the controller 180 may display the interval of the zone 550 where the progress bar is displayed and the extracted partial image is displayed, more shortly than the interval where another images are displayed, as shown in (d) of FIG. 7.

In this case, the length of the interval displayed more shortly may be proportional to the play time of the extracted partial image. For example, the play time of another images constituting the moving image data may be 30 minutes, whereas the play time of the extracted partial image may be 20 minutes. In this case, the length of the interval displayed shortly may be ⅔ of the length of the interval where another images are displayed, as shown in (d) of FIG. 7.

The controller 180 may change the arrangement order of another images, which constitute the moving image data, including the extracted partial image in accordance with the user's selection. For example, the controller 180 may insert all or some of the images taken from the specific lens between the images displayed in the zone 550 where the progress bar is displayed, as shown in (d) of FIG. 7. Alternatively, the controller 180 may delete at least one of the images including the extracted partial image in accordance with the user's selection.

Also, as described above, even in the case that the user swings the mobile terminal 100 at the number of predetermined times or strength stronger than the predetermined strength, the arrangement order of the images may be changed. The arrangement order of the images may be changed even in the case that the position of the mobile terminal 100 is changed.

In the aforementioned description made with reference to the drawings, at least two taken images may temporally be synthesized with each other to generate one moving image data. However, in addition to such temporal synthesis, the display zones of at least two taken images may be synthesized with each other to generate moving image data.

The moving image data obtained by synthesizing the display zones with each other means that the moving image data is obtained by the display zones of the synthesized images generated as a plurality of corresponding images constituting at least two images are synthesized with each other.

In this case, the corresponding images may be determined in accordance with the time when the images are taken. Generally, in case of the array camera having a plurality of lenses, the images start and end to be taken from the plurality of lenses simultaneously in accordance with the control of the user, whereby the images may be taken from the plurality of lenses at the same time. Accordingly, the respective images may correspond to another images in accordance with the time when the images are taken.

For example, it is assumed that there are two images A and B. In this case, if each of the images A and B includes ten images taken at an interval of 0.1 second, the first image constituting the image A may correspond to the first image constituting the image B, and the second image constituting the image A may correspond to the second image constituting the image B.

In this case, display zones of the first image constituting the image A and the second image constituting the image B may be synthesized with each other. In this way, the image obtained by the images generated by synthesizing the display zones of the images corresponding to each other will be referred to as the image obtained by synthesizing the display zones with each other.

Figure 8A:
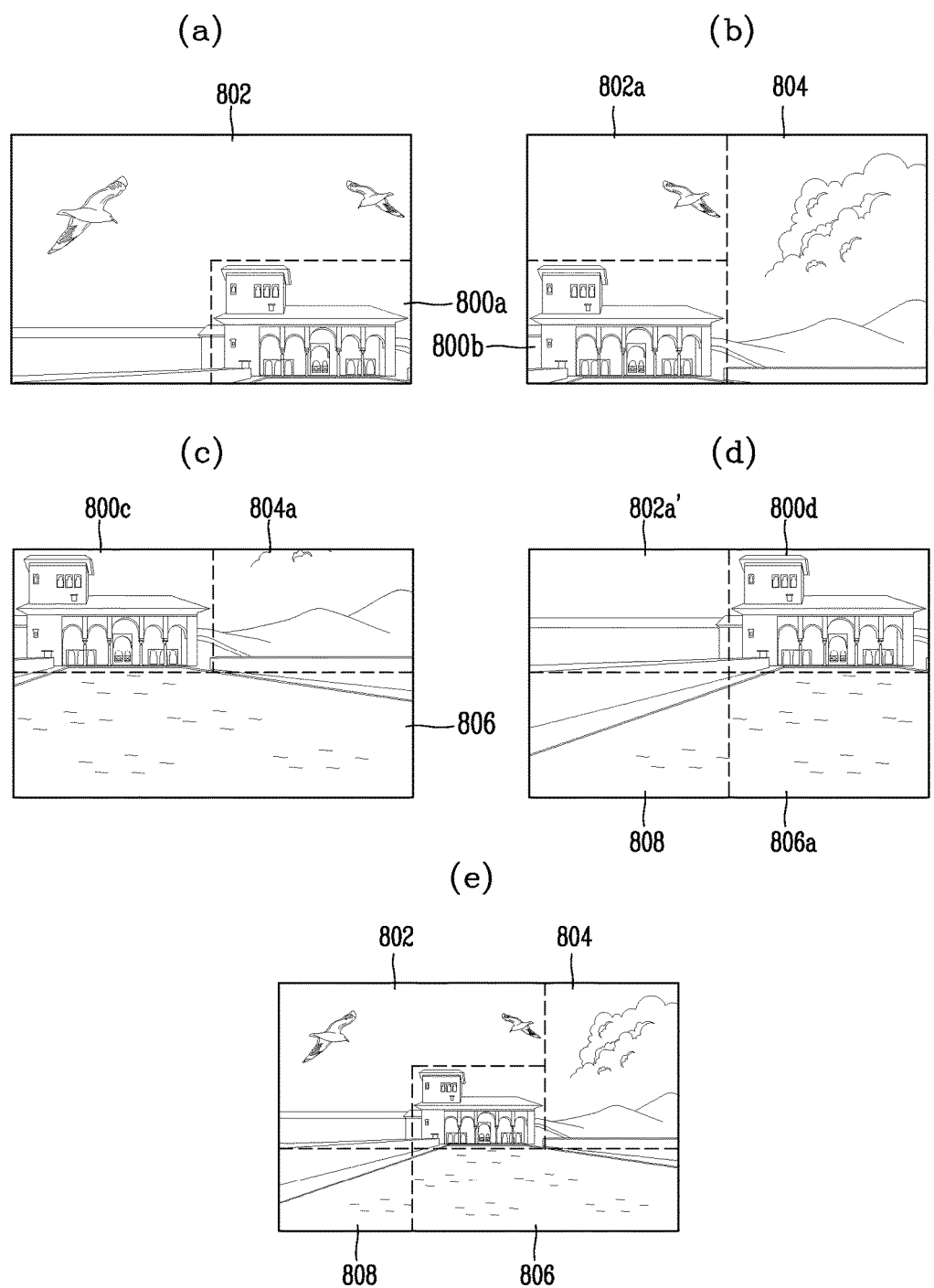

FIGS. 8a and 8b are diagrams illustrating an example of generating an image obtained by synthesizing display zones with each other by using images received through a plurality of lenses in a mobile terminal according to one embodiment of the present invention. Hereinafter, for convenience of description, it is assumed that the number of lenses provided in the camera 121 is 4.

As described above, the mobile terminal 100 according to the embodiment of the present invention may be provided with a plurality of lenses which are arranged. In this case, as shown in FIG. 8a, since the arranged positions of the plurality of lenses are different from one another, the images taken from the respective lenses may be different from one another.

In this case, the images taken from each of the plurality of lenses, that is, the images taken through each lens respectively have a common portion as shown in (a), (b), (c) and (d) of FIG. 8a. In this case, the controller 180 may identify portions, which are different from the common portions, from the respective images (for example, (a), (b), (c) and (d) of FIG. 8a).

The controller 180 may synthesize the portions, which are different from the common portions, with one another on the basis of the common portions. For example, if the controller 180 synthesizes the display zones of the images taken from the respective lenses in the order of (a), (b), (c) and (d) of FIG. 8a, the other portions except for the common portions may be synthesized on the basis of zones 800a, 800b, 800c and 800d where the images of the common portions are displayed.

In other words, in case of the image shown in (a) of FIG. 8a, the other portion 802 except for the common portion 800a may be used for synthesis of the display zones. in case of the image shown in (b) of FIG. 8a, the other portion 804 except for the common portion 800b and the portion 802a overlapped with (a) of FIG. 8a may be used for synthesis of the display zones. Also, in case of the image shown in (c) of FIG. 8a, the other portion 806 except for the common portion 800c and the portion 804a overlapped with (b) of FIG. 8a may be used for synthesis of the display zones. Also, in case of the image shown in (d) of FIG. 8a, the other portion 808 except for the common portion 800d and the portions 802a' and 806a overlapped with (c) of FIG. 8a may be used for synthesis of the display zones.

Accordingly, as shown in (e) of FIG. 8a, the moving image data may be generated by synthesizing the display zones of the images taken from each of the plurality of lenses, in more detail, synthesizing the portions 802, 804, 806 and 808 on the basis of the common portions 800*a*, 800*b*, 800*c* and 800*d*.

Meanwhile, in FIG. 8*a*, it is assumed that the display zones of the images taken from all the plurality of lenses are synthesized with one another. However, unlike FIG. 8*a*, the moving image data obtained by synthesizing the display zones may be generated using the images only taken from some lenses selected by the user.

FIG. 8*b* illustrates this example.

Referring to FIG. 8*b*(a), the controller 180 may receive at least two of the plurality of lenses output on the display module 151, which are selected by the user. For example, as shown in FIG. 8*b*, if the image 850 taken from the first lens and the image 852 taken from the second lens are selected, the controller 180 may synthesize the display zones only of the images taken from the selected two lenses.

Also, the image obtained by synthesizing the display zones may be generated in various manners in addition to the aforementioned method. For example, the controller 180 may determine any one of the plurality of images as a reference image and extract portions, which are different from the respective images constituting the reference image, from the respective images constituting the images which are not determined as the reference image, per corresponding images. And, the controller 180 may generate the image (image of the portions different from the respective images) that is comprised of the images of the extracted portions. Also, the controller 180 may generate the image, which is obtained by synthesizing the display zones, by synthesizing the generated image of the portions, which are different from the respective images constituting the reference image, in the periphery of the image determined as the reference image.

FIG. 8*b*(b) illustrates an example of the image generated through the above procedure and obtained by synthesizing the display zones.

FIG. 8*b*(b) illustrates that the image obtained by synthesizing the images 860 corresponding to the portion different from the respective images constituting the reference image is output on the display module 151 in the periphery of the image 850 (image taken from the first lens) determined as the reference image, that is, the position determined in accordance with the arrangement status of the lens taking the image determined as the reference image and the other lenses, that is, below the image determined as the reference image. As described above, in the mobile terminal 100 according to the embodiment of the present invention, the display zones of the images taken from at least two of the plurality of lenses, which are determined by the user's selection, may be synthesized, whereby the moving image data of which display zones are extended may be generated.

Such synthesis of the display zones may be performed in various manners. For example, all the display zones of the images which are taken may be synthesized as shown in FIGS. 8*a* and 8*b*, whereby synthesis of the display zones may be performed to extend the display zones. Also, synthesis of the display zones may be performed to replace a part of the display zones of the images which are taken, with a part of another images which are taken.

FIG. 9 is a diagram illustrating an example of synthesizing a part of an image taken from a specific lens to a part of an image taken from another lens in accordance with a user's selection in a mobile terminal according to one embodiment of the present invention.

Referring to FIG. 9(*a*), a part of a subject 900, that is, a head part 910 is selected by the user. In other words, as shown in FIG. 9(*a*), if the user touches the head part 910 of the subject 900 on the screen where the subject 900 is displayed, or if a touch and drag input of the user is sensed in the zone where the head part 910 of the subject 900 is displayed, only the head part 910 of the subject 900 may be selected as shown in FIG. 9(*a*).

In this case, the controller 180 may display at least one of graphic objects 902 and 904, which are intended to allow another image for substituting for the selected display part to be selected, in the periphery of the selected display part. These graphic objects 902 and 904 may be provided in various forms. For example, the graphic objects 902 and 904 may be provided in the form of a simple bar, or may be displayed as arrow shaped objects for allowing a rotation direction of a part of the subject to be selected as shown in FIG. 9(*b*).

In this case, the graphic objects 902 and 904 are displayed in the form of arrow shaped image for allowing the rotation direction to be selected, as angles of coverage for the same subject taken from the plurality of lenses are different from one another and thus the subject may seem to be rotated in case of the images taken from the different lenses if the camera 121 of the mobile terminal 100 according to the embodiment of the present invention includes the plurality of lenses arranged along a curve as shown in FIG. 9(*b*). Accordingly, if the selected part is replaced with a part of images taken from the different lenses, the selected part may be displayed on the display module 151 as the screen that seems to be rotated in accordance with the rotation angle selected by the user.

Accordingly, if any one of the graphic objects 902 and 904 shown in FIG. 9(*b*) is selected, the image of the selected part, that is, the image of the head part 910 may be replaced with a part of the image of taken from any one of the lenses corresponding to the rotation direction selected by the user. In other words, if the graphic object 902, which displays the rotation direction towards a horizontal direction, is selected, the controller 180 selects the image taken from any one of the lenses located in the horizontal direction, on the basis of the lens which takes the image currently output on the display module 151. In this case, the controller 180 may select any one lens located in the horizontal direction from the lenses set by the current reference in accordance with the time when the user touches the graphic object 902 or a drag input length after the user touches the graphic object 902.

If any one lens is selected through the graphic object 902, the controller 180 may select the part corresponding to the partial display zone selected by the user, that is, the zone where the head part 910 of the subject 900 is displayed, from the display zone of the image taken from the selected lens.

In other words, the controller 180 may respectively select portions corresponding to the partial display zone selected by the user, from the plurality of images constituting the image (hereinafter, referred to as synthesis target image) taken from the lens selected through the graphic object 902.

The controller 180 may select the display zone selected by the user from the plurality of images constituting the image (hereinafter, referred to as reference image) taken from the lens selected based on the current reference and replace the selected display zone with the portion selected from the synthetic target image.

In this case, the controller 180 may replace the selected display zone of each of the plurality of images constituting the reference image, that is, the zone of the head part 910 of the subject 900 with its corresponding zone of the head part of the subject 900 of each of the plurality of images constituting the synthesis target image. In this case, each of the plurality of images constituting the reference image may correspond to each of the plurality of images constituting the synthesis target image on the basis of the time when the images are taken.

FIG. 9(c) illustrates this example. Referring to FIG. 9(c), the screen on which the display zone of the head part 910 of the subject 900 selected by the user in FIG. 9(a) is rotated as much as a predetermined angle may be output on the display module 151.

In other words, for example, if the user touches the left side of the graphic object 902 or drags one point of the graphic object 902 in a left direction after touching one point, the image obtained by rotating the head part 910 of the subject 900 selected by the user to the left side may be output. This is because that the controller 180 has selected any one of lenses, which are located in a right horizontal direction of the lens selected as a reference lens, in accordance with the input of the user through the graphic object 902. The controller 180 may replace the display zone where the head part 910 of the subject 900 of the reference image is output with a partial display zone of the synthetic target image by using the image taken from the selected lens as the synthetic target image.

Accordingly, the head part 910 of the subject 900 output on the display module 151 may be rotated in a left direction as shown in FIG. 9(c) and then may be output on the display module 151 by using the image taken in a right direction as much as a predetermined angle, that is the image taken from the lens located in an opposite direction of the rotation direction selected by the user, to correspond to the case where the user selects the rotation direction towards the left side.

Similarly, if the user selects the graphic object 904 that displays a rotation direction in a vertical rotation, the image of the head part 910 of the subject 900 may be rotated in a vertical direction and then may be output on the display module 151. In other words, if the user selects the graphic object 904 that displays the rotation direction in a vertical direction, the controller 180 selects any one of the lenses in a vertical direction of the lens currently selected as a reference lens.

For example, if a touch of the user is sensed above the center of the zone where the graphic object 904 is displayed, or if a drag input of the user is sensed upwardly at one point of the zone where the graphic object 904 is displayed, the controller 180 may select any one of the lenses arranged downwardly from the lens currently selected as a reference lens. In this case, in order to select any one lens, the controller 180 may use a length of the drag input of the user or the point where the touch of the user is sensed at the zone where the graphic object 904 is displayed.

If any one of the lenses arranged in a vertical direction of the lens currently selected as a reference lens is selected, similarly to FIG. 9(c), the controller 180 may replace the display zone where the head part 910 of the subject 900 on the reference image is output with a partial display zone of the synthetic target image by using the image taken from the selected lens as the synthetic target image. FIG. 9(d) illustrates this example.

As shown in FIG. 9(d), the head part 910 of the subject 900 output on the display module 151 may be rotated in an upward direction and then may be output on the display module 151 by using the image taken in a downward direction as much as a predetermined angle, that is, the image taken from the lens located in an opposite direction of the rotation direction selected by the user, to correspond to the case where the user selects the rotation direction towards the upper side.

Accordingly, as shown in FIGS. 9(c) and 9(d), a part of the image currently output from the display module 151 through synthesis of the display zone may be replaced with a part of the image taken at another angle of coverage. And, the controller 180 may generate the image obtained by synthesis of the display zone as moving image data.

Meanwhile, according to the aforementioned description, if the user selects any one of the graphic objects 902 and 904, the current image may be replaced with the display zone of the partial image taken from any one lens corresponding to the selected rotation direction. Unlike this, information related to the images that may be replaced may be displayed in the periphery of the partial zone selected by the user.

For example, the controller 180 may extract the images of the display zone corresponding to the partial display zone selected by the user from the images taken from the lenses corresponding to the selected rotation direction. And, the controller 180 may generate thumbnail images from the respective extracted images and display the thumbnail images in the partial display zone selected by the user, that is, the periphery of the head part 910 of the subject 900. If any one of the thumbnail images is selected by the user, the controller 180 may replace the zone where the head part 910 of the subject 900 is displayed, with the extracted image corresponding to the selected thumbnail image.

Meanwhile, although the display zones of different images are synthesized partially with reference to FIG. 9, this synthesis of the display zones may be performed on the basis of the timing point according to selection of the user.

For example, the controller 180 may perform synthesis of the display zones for the images only after the time when the images output on the display module 151 are partially selected by the user. In other words, the controller 180 may perform synthesis of the display zones for the images only corresponding to the time after the user selects some of the plurality of images constituting the images output on the display module 151.

In this case, the controller 180 may select the images only corresponding to the time after the user selects some of the plurality of images constituting the image taken from the lens selected to correspond to the input of the user, and may use the selected images for synthesis of the display zones. Accordingly, in this case, the moving image data may be generated by synthesizing the images corresponding to the time after a predetermined time with some of the images taken from another lens.

Also, in the aforementioned description, although synthesis of the display zones is performed for the images corresponding to the time after a predetermined time, the user may select the time when synthesis of the display zones ends, as well as a predetermined time. For example, in a state that synthesis of the display zones is performed, if a touch input for the graphic object for selecting ending of synthesis of the display zones is sensed, the controller 180 may end synthesis of the display zones. Accordingly, in this case, the moving image data may be generated by synthesizing the images only corresponding to a certain time interval with some of the images taken from another lens.

Meanwhile, in the aforementioned description, although one moving image data may be generated using the plurality of images taken from the plurality of lenses, moving image data previously stored in the memory 160 may be used.

Figure 10:
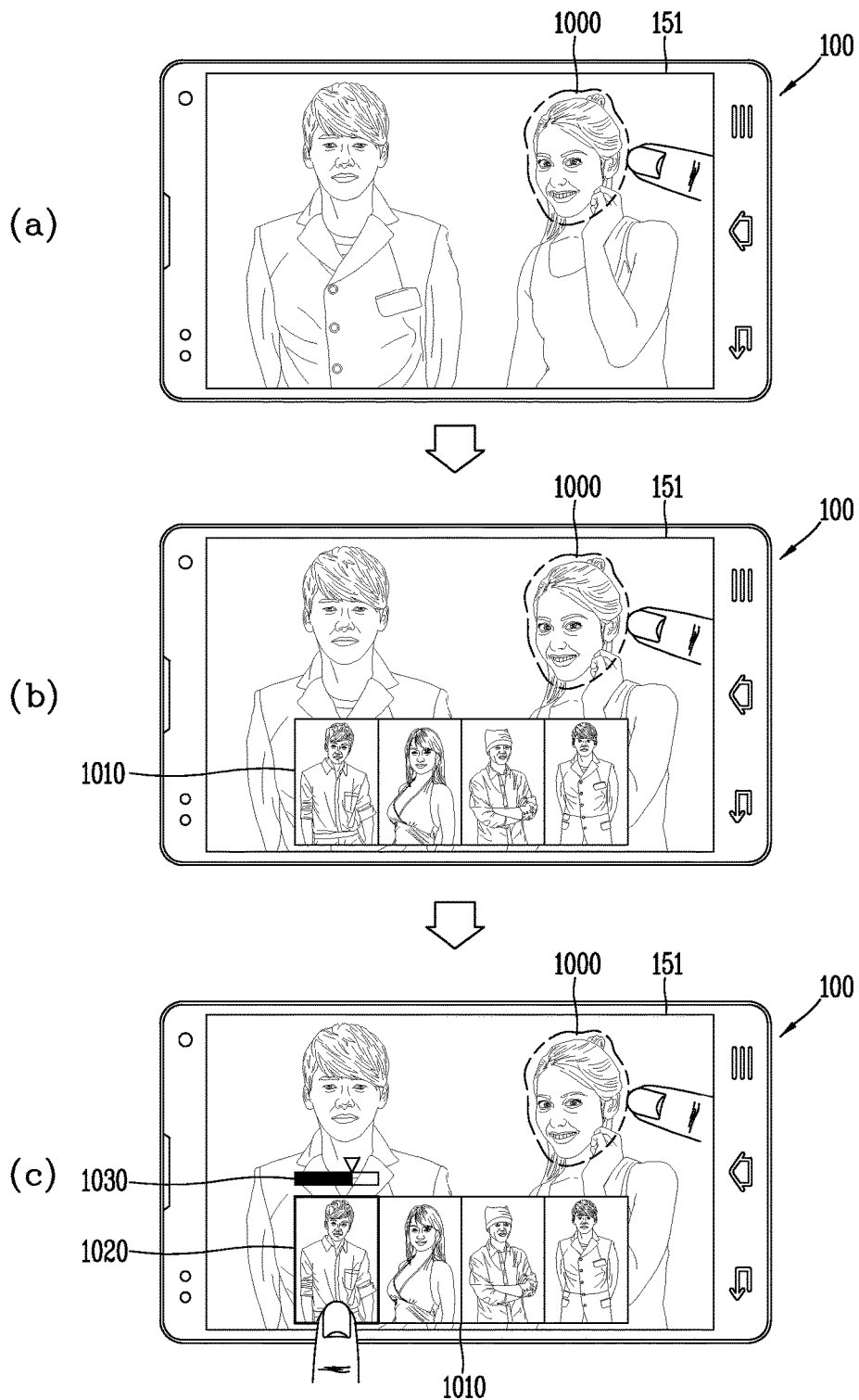
FIG. 10 is a diagram illustrating an example of displaying different image data on a display module by using a feature point of a subject image selected by a user in a mobile terminal according to one embodiment of the present invention.

FIG. 10 is a diagram illustrating an example of displaying different image data on a display module by using a feature point of a subject image selected by a user in a mobile terminal according to one embodiment of the present invention.

First of all, referring to FIG. 10(a), the controller 180 may output the image taken from any one of the plurality of lenses on the display module 151. And, the controller 180 may select some of the images output on the display module 151 to correspond to a touch input of the user.

For example, if a touch and drag input of the user is sensed in one zone on the display module 151, the controller 180 may recognize that one zone on the display module 151 corresponding to the sensed touch and drag input of the user is selected. Alternatively, as shown in FIG. 10(a), if the touch and drag input of the user is sensed in one zone on the display module 151, the controller 180 may recognize that one zone on the display module 151 where the touch input of the user is sensed is selected.

In this case, one zone on the display module 151, where is selected by the touch and drag or touch input of the user, may be a specific subject of the image currently output on the display module 151 or the display zone corresponding to a part 1000 of the specific subject.

In this case, the controller 180 extracts a feature point for the part 1000 of the subject selected by the user. For example, as shown in FIG. 10(a), if the part of the subject selected by the user is a "face" of the subject, the controller 180 may extract a feature point of the face of the subject by using face recognition.

If the feature point for the part 1000 of the subject selected by the user is extracted, the controller 180 may search whether the image having the same feature point as the above feature point exists in the images stored in the memory 160. For example, as described above, if the part of the subject selected by the user is a "face" of the subject, the controller 180 may search for the image having the feature point of the "face" of the subject, that is, the image which includes a face image similar to the "face" of the subject, from the memory 160.

The controller 180 may output the searched result to at least a zone 1010 (hereinafter, referred to as child view zone) on the display module 151. FIG. 10(b) illustrates this example.

Referring to FIG. 10(b), a plurality of images may be output to the child view zone 1010. In this case, the plurality of images include at least one having the same feature point as that of the part 1000 of the subject selected by the user among the images stored in the memory 160.

In this case, the plurality of images output to the child view zone 1010 may be different images which are obtained by taking the subject selected by the user after or before the image currently output on the display module 151 is taken.

Also, instead of the plurality of images, a representative image (for example, thumbnail image) that is generated from the plurality of images and may represent each of the plurality of images may be output to the child view zone 1010.

The controller 180 may select any one of the plurality of images output to the child view zone 1010 to correspond to selection of the user. The controller 180 may output the selected one of the images included in the child view zone 1010 to be only played and output the other images as still images on the display module 151.

If any one of the images output to the child view zone 1010 is selected by the user, the controller 180 may output the graphic object for selecting the time interval when the selected image will be played, that is, the point where playback of the selected image starts and the time when playback of the selected image ends, to the periphery of any one of the images of the child view zone 1010, which is selected by the user. FIG. 10(c) illustrates this example.

Referring to FIG. 10(c), if any one 1020 of the images output to the child view zone 1010 is selected, the controller 180 may output the graphic object 1030 to the periphery of the image 1020. The controller 180 may determine a time interval where any image 1020 will be played, on the basis of the touch input or the touch and drag input of the user for the graphic object 1030. Also, the controller 180 may play any one image 1020 in the child view zone 1010 on the basis of the determined playback start time and playback end time.

Also, as described above, the plurality of images output from the child view zone 1010 are the images that include at least one image having the same feature as that of the part 1000 of the subject selected by the user. Accordingly, the controller 180 may extract a part of the display zone having the same feature point from the plurality of images output from the child view zone 1010.

For example, the controller 180 may detect the images having the same feature point from the plurality of images output from the child view zone 1010 and extract some zones only having the same feature point from the detected images. Also, the controller 180 may generate the image by using the extracted some zones only.

The controller 180 may replace the part 1000 of the subject selected by the user output on the display module 151 with the image generated from the images of the extracted partial zones. Accordingly, the controller 180 may generate the moving image data by replacing the part of the display zone of the image currently output on the display module 151 with the part of the display zone on another images having the same feature point through synthesis of the display zones.

Meanwhile, although some of the images previously stored in the memory 160 are selected in the aforementioned description, some of the images stored in the external server such as a cloud server may be selected.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

Also, according to one embodiment disclosed in this specification, the aforementioned method may be implemented in a recording medium, in which a program is recorded, as a code that can be read by a processor. Examples of the recording medium that can be read by the processor include a ROM, a RAM, a CD-ROM, a magnetic tape, a floppy disk, and an optical data memory. Also, another example of the recording medium may be implemented in a type of carrier wave (for example, transmission through Internet).

The invention claimed is:

1. A mobile terminal comprising:
a touch screen;
a camera provided with a plurality of lenses arranged along a plurality of lines such that each lens is located at a different positon; and
a controller configured to:
record a plurality of moving images using a plurality of images captured by the plurality of lenses;
cause the touch screen to display a first image of a first moving image captured by a first lens among the plurality of lenses;
extract partial images corresponding to a same subject with a part of the first image from other moving images taken from lenses other than the first lens among the plurality of lenses in response to a first touch input selecting the part of the first image;
cause the touch screen to display thumbnail images respectively corresponding to the extracted partial images with the part of the first image;
cause replacement of first part images corresponding to the same subject in the first moving image with second part images corresponding to the same subject in a second moving image captured by a second lens among the plurality of lenses in response to a second touch input selecting a thumbnail image related to the second moving image from among the displayed thumbnail images; and
synthesize the first moving image and the second moving image captured at a same time by the first lens and second lens, respectively, after receiving the first touch input such that the first part images are replaced with the second part images; and
generate a single moving image with the synthesized first and second moving images.

2. The mobile terminal according to claim 1, wherein the controller is further configured to:
cause the touch screen to display the plurality of images captured via the plurality of lenses, the plurality of images comprising the first image; and
cause the first lens corresponding to one of the plurality of images to capture an image when the one of the plurality of images is selected,
wherein:
the plurality of lenses comprise more than two lenses; and
the first lens is different from the second lens.

3. The mobile terminal according to claim 2, wherein:
the second lens is selected in a state that the image is being captured by the first lens; and
the controller is further configured to capture an image received from the second lens subsequently to the capturing of the image by the first lens in response to the selection of the second lens.

4. The mobile terminal according to claim 3, wherein the controller is further configured to stop the capturing of the image received through the first lens in response to the selection of the second lens.

5. The mobile terminal according to claim 3, wherein the controller is further configured to:
cause the touch screen to display a progress bar indicating a status of the plurality of moving images at at least one zone of the touch screen, wherein the progress bar is divided into a plurality of sections based on a number of lenses used to capture the plurality of images constituting the plurality of moving images; and
cause the touch screen to display preview images corresponding to any one of the plurality of images captured to generate the plurality of moving images at a periphery of the plurality of sections.

6. The mobile terminal according to claim 5, wherein the plurality of moving images are generated by arranging the plurality of captured images based on an arrangement of the preview images displayed on the touch screen.

7. The mobile terminal according to claim 6, wherein:
positions of the preview images output on the progress bar are variable based on selection by a user; and
the controller is further configured to change an arrangement order of the plurality of images constituting the plurality of moving images according to changed positions of the preview images.

8. The mobile terminal according to claim 2, wherein the controller is further configured to cause the touch screen to display an image currently being captured at at least one zone of the touch screen when capturing of the image through any one of the plurality of lenses starts.

9. The mobile terminal according to claim 8, wherein the controller is further configured to cause one of the plurality of lenses to capture the image in response to a touch received at one of the at least one zone, the one of the plurality of lenses corresponding to a lens focused on a subject included in the touched one of the at least one zone, the touch received while an image being captured via the first lens is displayed at the one of the at least one zone.

10. The mobile terminal according to claim 1, wherein the second lens includes a plurality of lenses except for the first lens based on selection by a user.

11. The mobile terminal according to claim 1, wherein the controller is further configured to generate one moving image data by using at least two of the plurality of images after the capturing of the plurality of images is finished.

12. The mobile terminal according to claim 11, wherein the controller is further configured to:
cause the touch screen to display a progress bar indicating that the moving image data is generated at at least one zone of the touch screen, wherein the progress bar is divided into a plurality of sections based on a number of lenses used to capture the plurality of images constituting the moving image data; and
cause the touch screen to display thumbnail images corresponding to the at least two of the plurality of images used to generate the moving image data at a periphery of the plurality of sections.

13. The mobile terminal according to claim 11, wherein the controller is further configured to:
partition the touch screen into a plurality of zones;
cause the touch screen to display thumbnail images on a first zone of the plurality of zones, each of the thumbnail images respectively corresponding to one of the plurality of captured images;
cause the touch screen to display a plurality of thumbnail images selected from preview images on a second zone of the plurality of zones; and
generate one moving image data by arranging corresponding captured images in accordance with an order of the thumbnail images displayed on the second zone.

14. The mobile terminal according to claim 13, wherein the controller is further configured to:
cause the touch screen to display a graphic object for allowing at least a part of the captured images corresponding to the thumbnail images to be selected by a user at a periphery of a thumbnail image when the thumbnail image is selected from the first zone; and extract the part of the captured images, which is selected by the user, from a captured image corresponding to the selected thumbnail image.

15. The mobile terminal according to claim 14, wherein the controller is further configured to generate one moving image data by arranging the captured images, which include the part of the captured images, in accordance with the order of the thumbnail images displayed on the second zone.

16. The mobile terminal according to claim 11, wherein the controller is further configured to cause replacement of at least a partial display zone of the first image with at least a partial display zone of the second image based on selection by a user.

17. The mobile terminal according to claim 16, wherein the controller is further configured to:

extract at least one partial image from each of images captured by a plurality of second lenses in response to selection of at least one image zone from the first image; and synthesize partial images, which are extracted from any one of the images captured by the plurality of second lenses based on selection by the user from the extracted partial images, with at least one image of the first image except for the selected at least one image zone.

18. The mobile terminal according to claim 16, wherein the controller is further configured to cause the touch screen to display thumbnail images at a periphery of the selected one zone.

19. The mobile terminal according to claim 1, wherein the plurality of lenses comprise more than two lenses that are in a matrix arrangement on a same side of the mobile terminal.

20. The mobile terminal according to claim 19, wherein the plurality of lenses comprise 16 lenses.

21. The mobile terminal according to claim 19, wherein the plurality of images are captured by the plurality of lenses at the same time.

22. The mobile terminal according to claim 1, wherein the camera is an array camera.

\* \* \* \* \*